United States Patent
Kim et al.

(10) Patent No.: US 9,300,696 B2
(45) Date of Patent: Mar. 29, 2016

(54) METHOD OF SHARING ONE OR MORE MEDIA IN A SESSION BETWEEN TERMINALS

(75) Inventors: Laeyoung Kim, Gyeonggi-do (KR); Taehyeon Kim, Gyeonggi-do (KR); Hyunsook Kim, Gyeonggi-do (KR)

(73) Assignee: LG Electronics Inc., Seoul (KR)

( * ) Notice: Subject to any disclaimer, the term of this patent is extended or adjusted under 35 U.S.C. 154(b) by 130 days.

(21) Appl. No.: 13/642,600

(22) PCT Filed: Apr. 21, 2011

(86) PCT No.: PCT/KR2011/002873
§ 371 (c)(1),
(2), (4) Date: Oct. 22, 2012

(87) PCT Pub. No.: WO2011/132956
PCT Pub. Date: Oct. 27, 2011

(65) Prior Publication Data
US 2013/0041954 A1    Feb. 14, 2013

Related U.S. Application Data

(60) Provisional application No. 61/326,660, filed on Apr. 22, 2010.

(51) Int. Cl.
*G06F 15/16* (2006.01)
*H04L 29/06* (2006.01)

(52) U.S. Cl.
CPC ........ *H04L 65/1069* (2013.01); *H04L 65/1083* (2013.01); *H04L 65/1089* (2013.01); *H04L 65/1093* (2013.01)

(58) Field of Classification Search
CPC ............. H04L 29/06374; H04L 65/1089; H04L 65/1083; H04L 65/1093; H04L 65/1069; G06F 15/16
USPC ....................................................... 709/204
See application file for complete search history.

(56) References Cited

U.S. PATENT DOCUMENTS

| | | | |
|---|---|---|---|
| 7,987,232 B2 * | 7/2011 | Thornton et al. ............. | 709/205 |
| 7,996,566 B1 * | 8/2011 | Sylvain et al. ................ | 709/248 |
| 8,516,476 B2 * | 8/2013 | Chen et al. .................... | 717/176 |
| 8,582,566 B2 * | 11/2013 | Bae et al. ...................... | 370/353 |
| 8,671,201 B2 * | 3/2014 | Keller ............... H04W 36/0022 |  |
| | | | 370/352 |
| 8,725,808 B2 * | 5/2014 | Puente et al. ................. | 709/204 |

(Continued)

FOREIGN PATENT DOCUMENTS

| | | |
|---|---|---|
| KR | 10-2007-0053539 A | 5/2007 |
| KR | 10-2007-0747718 B1 | 8/2007 |
| KR | 10-2009-0000052 A | 1/2009 |

OTHER PUBLICATIONS

Search Report issued in corresponding International Application No. PCT/KR2011/002873 dated Dec. 22, 2011.

*Primary Examiner* — Joseph E Avellino
*Assistant Examiner* — Binod J Kunwar
(74) *Attorney, Agent, or Firm* — Morgan, Lewis & Bockius LLP

(57) ABSTRACT

In a first embodiment, a specific UE is enabled to copy all or a portion of one or more or media in an ongoing session with a remote end to another UE, so that the media can be shared by many UEs. In a second embodiment, when a specific UE shares all or a portion of media in an ongoing session with another UE, the shared media may be controlled.

11 Claims, 11 Drawing Sheets

(56) References Cited

U.S. PATENT DOCUMENTS

| | | | |
|---|---|---|---|
| 9,037,734 B2* | 5/2015 | Kim | H04L 65/1016 709/228 |
| 9,094,423 B2* | 7/2015 | Atarius | H04L 65/1083 |
| 9,119,115 B2* | 8/2015 | De Foy | H04W 36/0022 |
| 2007/0005696 A1* | 1/2007 | Beers et al. | 709/204 |
| 2008/0031227 A1* | 2/2008 | Wang | 370/352 |
| 2008/0235322 A1* | 9/2008 | Holm et al. | 709/201 |
| 2009/0063703 A1* | 3/2009 | Finkelstein et al. | 709/240 |
| 2009/0089379 A1* | 4/2009 | Pegg | 709/206 |
| 2009/0106389 A1* | 4/2009 | Hakkarainen et al. | 709/217 |
| 2009/0168985 A1* | 7/2009 | Yu et al. | 379/202.01 |
| 2009/0204671 A1* | 8/2009 | Hawkins et al. | 709/204 |
| 2009/0265426 A1* | 10/2009 | Svendsen et al. | 709/204 |
| 2009/0268712 A1* | 10/2009 | Bottiero et al. | 370/352 |
| 2009/0286561 A1* | 11/2009 | Lee et al. | 455/466 |
| 2009/0313378 A1* | 12/2009 | Mahdi et al. | 709/227 |
| 2009/0313553 A1* | 12/2009 | Thornton et al. | 715/751 |
| 2009/0319676 A1* | 12/2009 | Jin et al. | 709/228 |
| 2010/0312832 A1* | 12/2010 | Allen | H04L 65/1016 709/204 |
| 2010/0312834 A1* | 12/2010 | Doken | H04L 65/1093 709/205 |
| 2010/0312841 A1* | 12/2010 | Doken | H04L 65/1093 709/206 |
| 2010/0312897 A1* | 12/2010 | Allen | H04L 12/1822 709/227 |
| 2010/0325212 A1* | 12/2010 | Mahdi | 709/205 |
| 2011/0040836 A1* | 2/2011 | Allen | H04L 65/1093 709/205 |
| 2011/0053571 A1* | 3/2011 | Mahdi | H04W 36/12 455/414.1 |
| 2011/0116473 A1* | 5/2011 | Shaheen | H04L 65/1093 370/331 |
| 2011/0161508 A1* | 6/2011 | Kim | H04L 65/4015 709/228 |

* cited by examiner

METHOD OF SHARING ONE OR MORE MEDIA IN A SESSION BETWEEN TERMINALS

TECHNICAL FIELD

The present invention relates to a method of sharing media between terminals, and a control server.

BACKGROUND ART

In general, a session between a first terminal and a service provider or between the first terminal and a second terminal in a network based on an IMS (IP Multimedia Subsystem) is controlled to be performed by an application server.

Recently, users use various types of terminals (e.g., a portable terminal, a TV, a computer, and the like), research into a technique that may be able to transfer/copy a portion or the entirety of a media flow constituting a session ongoing through a user's first terminal to the user's second terminal has been conducted.

Transfer, move, or copy a portion or the entirety of a media flow constituting a session is known as inter-UE transfer (IUT).

Such IUT may be performed between terminals (or UEs) belonging to different users, as well as between terminals belonging to one user, and recently, EGPP Release 10 has researched it. Thus, family members, business members, social network members may share information, work together, or enjoy entertainment using IUT. IUT will be described with reference to FIG. 1.

FIG. 1 is a conceptual view illustrating related art IUT.

Referring to the left portion of FIG. 1(a), a first user owns a plurality of terminals (or UEs), e.g., UE-1 UE-2, and UE-3 as illustrated. The first user is performing a session including audio and video media with a remote end (or remote party), e.g., a service provider, through the UE-1. An SCC AS (Service Centralization and Continuity Application Server) handling controlling of such a session is illustrated.

In this situation, the first user wants to perform the session with the remote end through his UE-2 and UE-3, respectively. For example, on the assumption that the UE-1 is a cellular phone, the UE-2 is an earset or a headset having a communication function, and the UE-3 is a headup display (HUD) having a communication function, the first user wants to perform the audio media session through the earset or the headset and perform the video media session through the headup display with the remote end.

Then, as illustrated in the right portion of FIG. 1(a), in the session including the audio and video media currently performed through the UE-1, the audio media flow is transferred to the UE-2 and the video media flow is transferred to the UE-3. Here, even after the audio and video media flows are transferred to the UE-2 and the UE-3, respectively, the UE-1 maintains authority to control the media flows as it is.

In this case, the UE-1 is called a controller UE, while the UE-2 and the UE-3 are called controllee UEs. The session which includes the audio and video media and in which the UE-1, UE-2, and UE-3 are participating is called a collaborative session.

Meanwhile, referring to the left portion of FIG. 1(b), the first user is performing the session regarding the audio media through the UE-2 and the session regarding the video media through the UE-3.

Here, the UE-1 has authority to control the audio media flow of the UE-2 and the video media flow of the UE-3, but as illustrated in the right portion of FIG. 1(b), the UE-1 transfers its authority to control to the UE-2. Thus, the UE-2 includes the audio and video media and is a controller UE with respect to the collaborative session in which the UE-2 and the UE-3 are participating.

Meanwhile, the IUT is a concept of a transfer between a plurality of UEs of the same user, but, broadening the concept, research is ongoing to transfer a portion or the entirety of a media flow and/or a service control authority to a terminal belonging to a different user has also been conducted.

In order for the UE-1 to perform the IUT operation, whether or not the respective target terminals, e.g., the UE-2 and UE-3 have been registered to a network may be required to be known.

Also, in order for the UE-1 to perform the IUT operation, information regarding capability of the respective target terminals, e.g., the foregoing UE-2 and UE-3, e.g., hardware resource information (i.e., information regarding a speaker microphone, a camera, and a screen), hardware configuration information (e.g., resolution information, etc.), information regarding supportable media, codec information, and the like, may be required.

Meanwhile, referring to the left portion of FIG. 1(c), the first user owns a plurality of terminals (or UEs), e.g., UE-1 UE-2, and UE-3 as illustrated. The first user is performing a session including audio and video media through the UE-1.

In this situation, the first user wants to transfer the session ongoing through his UE-1 to the UE-3.

Then, as illustrated in the right portion of FIG. 1(c), the session including the audio and video media performed currently through the UE-1 is transferred to the UE-3. Also, authority to control the session is also transferred from the UE-1 to the UE-3. Thus, since the audio and video media constituting the session have all been transferred to the UE-3, a collaborative session is not generated.

So far, the transfer of the entirety or a portion of the session has been described.

Technical Problem

According to the foregoing related art, only the concept of transferring the entirety or a portion of a session has been proposed. However, in order to allow several terminals to share the entirety or a portion of a session, a technique of copying the entirety or a portion of a session to a different terminal is required.

For example, in the related art, in a situation that two users are making a video call or conference, although the ongoing video call or conference is desired to be displayed for a different user, only audio media or video media can be transferred in the session for the video call or conference and the session for the video call or conference cannot be copied to the different user.

In addition, in the related art, in a situation that a certain user is reproducing (or playing) a video by using a terminal upon receiving it from a remote end, although the user wants the played video to be displayed for a different user, the user may transfer only the session for the video to a different terminal but cannot copy the session for the video.

A first embodiment disclosed in the present disclosure provides a method for allowing the entirety or a portion of media of a session ongoing between two terminals to be copied to a different terminal. Meanwhile, in the case that the entirety or a portion of the ongoing session is copied to a different terminal in the first embodiment, it is required to clarify who is to control the media.

Thus, a second embodiment disclosed in the present disclosure provides controlling of the copied media.

Technical Problem

In order to achieve the above object, in the first embodiment of the present invention, a particular UE copies the entirety or a portion of certain media, among one or more media within a session performed between the UE and a remote end, to a different UE, thus allowing the media to be shared by several UEs.

In order to achieve the above object, in the second embodiment of the present invention, a method for controlling copied media is provided.

In detail, according to the second embodiment of the present invention, there is provided a method of controlling, by a control server, a first terminal, which is currently performing a session including one or more of media among audio, video, and text media, with a remote end to share one or more of media within the session with a second terminal.

The control method may include: receiving, by the control server, a media sharing request message for requesting sharing one or more media within the session with the remote end between the first terminal and the second terminal, from the first terminal or the second terminal; requesting, by the control server, a resource allocation from a media server handling media sharing; checking, by the control server, whether or not there is information regarding whether or not the remote end has ability to provide a playback control function with respect to the media requested to be shared; and transmitting, by the control server, a session change request message to the remote end such that the session goes through the media server. Here, the session change request message may include an indicator for inquiring as to whether or not the remote end has ability to provide the playback control function with respect to the media requested to be shared, when the information does not exist.

The control method may further include: receiving, by the control server, a session change response message from the remote end. Here, when the session change request message includes the inquiry indicator, information whether or not the remote end has ability to provide the playback control function with respect to the media requested to be shared may be provided to the control server through the session change response message.

The control method may further include: receiving, by the control server, a media playback control request message by the first terminal or the second terminal; checking, by the control server, as to whether or not the remote end can provide the playback control function with respect to the shared media; and when the remote end cannot perform the playback control function, requesting an entity that controls the media server to control playback with respect to the shared media such that the shared media can be controlled according to the request.

The media sharing request message may include information indicating which terminal is a playback control master with respect to the media requested to be shared.

The media sharing request message may further include one or more of information indicating what is the media requested to be shared and information indicating which terminal is to share the media.

The media sharing request message may be a media copy request message or a media replication request message.

The method may further include: one or more of authorizing, by the control server, the media sharing request message, after the media sharing request message is received; and transmitting, by the control server, a resource allocation request message to the media server, and subsequently receiving a resource allocation response message from the media server.

The method may further include: when the second terminal is not handled by the control server, transmitting, by the control server, a session setup request message to a different control server serving the second terminal, after requesting sharing from the media server; and receiving, by the control server, a session setup response message from the different control server. Here, the checking of the presence of the information may be performed when the session setup response message is received.

The media playback control request message may include one or more of information regarding media to be controlled for playback, information indicating a control operation requested for playback of the media, and information indicating a terminal to which the playback of the media is applied.

Inability of the remote end to perform playback control may indicate that the remote end has no ability to provide the playback control function or that requested media playback is not related to any of the first and second terminals.

The media playback control request message may further include information indicating who is a master handling playback control of the media requested for playback control.

The method may further include: when the first terminal or the second terminal which has transmitted the received media playback control request message is not a master handling the playback control, transferring the media playback control request message to a terminal corresponding to the master; and receiving an acceptance message with respect to the media playback control request message from the corresponding terminal.

The media sharing request message may further include information indicating whether or not an extra connection is required for playback control with respect to the media requested to be shared.

The method may further include: determining, by the playback control server, whether to an extra connection is to be generated for playback control with respect to the media based on the received media sharing request message; and when it is determined that the connection establishment is required, establishing a connection for playback control with the first terminal and the second terminal, respectively.

Meanwhile, according to the second embodiment of the present invention, there is also provided a control server providing control to allow a first terminal, which is currently performing a session including one or more of media among audio, video, and text media, with a remote end to share one or more of media within the session with a second terminal.

The control sever may include: a transceiver unit; and a controller configured to control the transceiver unit.

The controller may perform: receiving a media sharing request message for requesting sharing one or more media within the session with the remote end between the first terminal and the second terminal, from the first terminal or the second terminal through the transceiver unit; requesting a resource allocation from a media server handling media sharing through the transceiver unit; checking whether or not there is information regarding whether or not the remote end has ability to provide a playback control function with respect to the media requested to be shared through the transceiver unit; and transmitting a session change request message to the remote end through the transceiver unit such that the session goes through the media server. Here, the session change request message may include an indicator for inquiring as to whether or not the remote end has ability to provide the playback control function with respect to the media requested to be shared, when the information does not exist.

The controller may further perform: receiving a session change response message from the remote end through the transceiver unit. Here, when the session change request message includes the inquiry indicator, information whether or not the remote end has ability to provide the playback control function with respect to the media requested to be shared may be provided to the control server through the session change response message.

The controller may further perform: receiving a media playback control request message by the first terminal or the second terminal through the transceiver unit; checking as to whether or not the remote end can provide the playback control function with respect to the shared media; and when the remote end cannot perform the playback control function, requesting an entity that controls the media server to control playback with respect to the shared media through the transceiver unit such that the shared media can be controlled according to the request.

Advantageous Effects

According to an embodiment of the present disclosure, terminals sharing certain media within a session can control the media, thus allowing several users to share the same experience.

According to an embodiment of the present disclosure, media provided by a remote end to a first terminal can be copied to a second terminal according to a corresponding request, and in this case, although the remote end does not have a function of providing authority to control the copied media, the first or the second terminal can control the media, whereby users of the two terminals can share the same experience through the media.

BEST MODES

Figure 1:
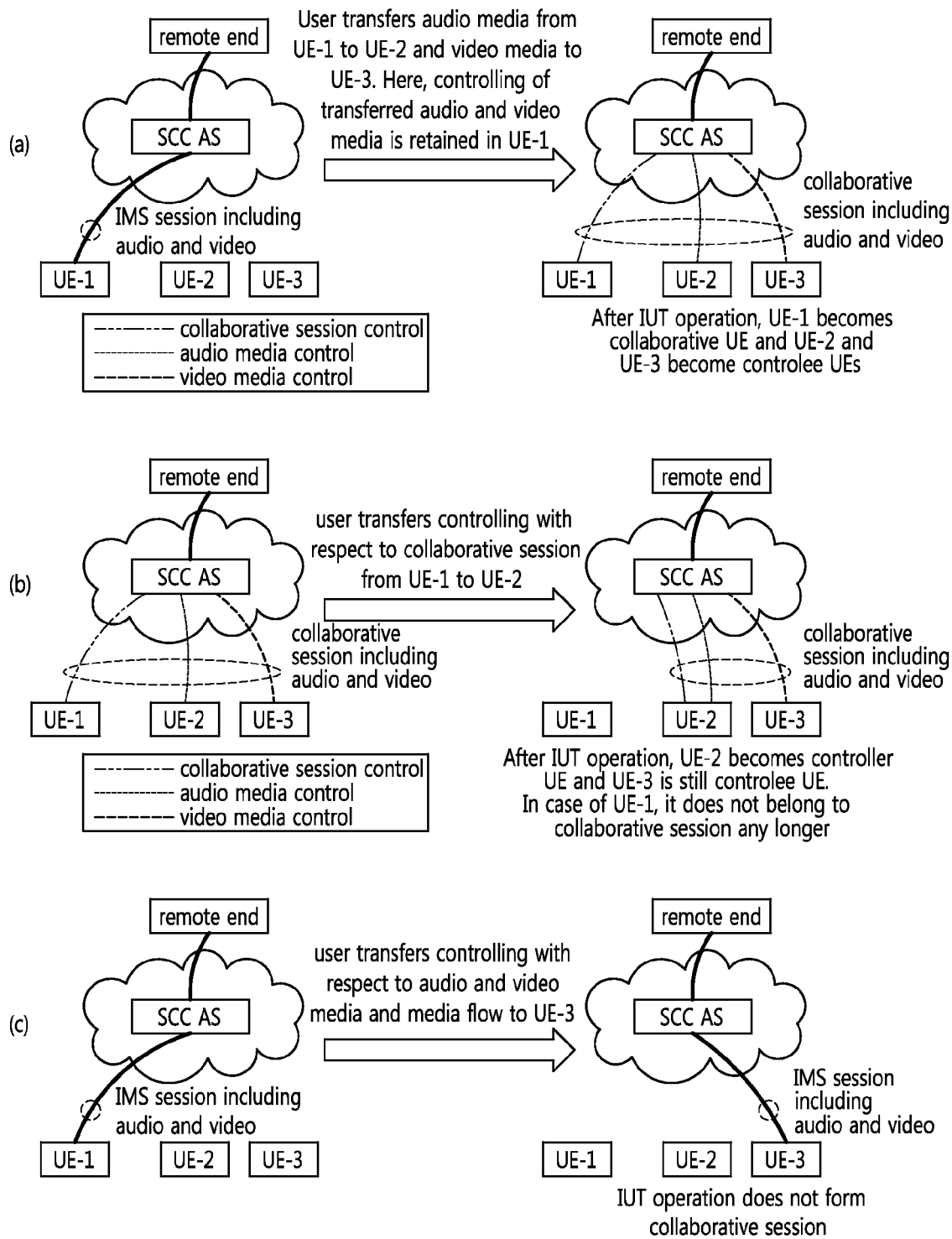
FIG. 1 is a conceptual view illustrating a transfer between terminals according to the related art.

The terminology used herein is for the purpose of describing particular embodiments only and is not intended to be limiting of the invention. Unless otherwise defined, all terms used herein have the same meaning as commonly understood by one of ordinary skill in the art to which this invention pertains, and should not be interpreted as having an excessively comprehensive meaning nor as having an excessively contracted meaning. If technical terms used herein is erroneous that fails to accurately express the technical idea of the present invention, it should be replaced with technical terms that allow the person in the art to properly understand. The general terms used herein should be interpreted according to the definitions in the dictionary or in the context and should not be interpreted as an excessively contracted meaning.

As used herein, the singular forms "a", "an" and "the" are intended to include the plural forms as well, unless the context clearly indicates otherwise. It will be further understood that the terms "comprises" "comprising," "includes" and/or "including" when used herein, specify the presence of stated features, integers, steps, operations, elements, and/or components, but do not preclude the presence or addition of one or more other features, steps, operations, elements, components, and/or groups thereof.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present invention.

It will be understood that when an element is referred to as being "connected with" another element, it can be directly connected with the other element or intervening elements may also be present. In contrast, when an element is referred to as being "directly connected with" another element, there are no intervening elements present.

The exemplary embodiments of the present invention will now be described with reference to the accompanying drawings, in which like numbers refer to like elements throughout. In describing the present invention, if a detailed explanation for a related known function or construction is considered to unnecessarily divert the gist of the present invention, such explanation has been omitted but would be understood by those skilled in the art. The accompanying drawings of the present invention aim to facilitate understanding of the present invention and should not be construed as limited to the accompanying drawings. The technical idea of the present invention should be interpreted to embrace all such alterations, modifications, and variations in addition to the accompanying drawings.

In the accompanying drawings, UE (User Equipment) is illustrated, but the illustrated UE may be mentioned by other names such as terminal, ME (Mobile Equipment), or the like. Also, UE may be a portable device such as a notebook computer, a portable phone, a PDA, a smart phone, a multimedia device, or the like, or may be a device that cannot be portable such as a PC, a vehicle-mounted device.

DEFINITION OF TERMS

Hereinafter, before describing the present invention with reference to the accompanying drawings, terms used in the present disclosure will be briefly defined in order to help understand the present invention.

1) IMS (IP Multimedia Subsystem) is a network technique allowing even a wireless terminal to perform packet switching (PS) based on an IP (Internet Protocol). The IMS was proposed to connect all of wired/wireless terminals through IP (All-IP).

The IMS-based network includes an HSS (Home Subscriber Server) including a database storing user's subscriber information and other entities. Also, the IMS-based network includes a CSCF (Call Session Control Function) for processing control signaling, registration, and a procedure for a session. The CSCF may include P-CSCF (Proxy-CSCF), S-CSCF (Serving-CSCF), 그리고 I-CSCF (Interrogating-CSCF). The P-CSCF operates as a first access point for a UE in the IMS-based network. The S-CSCF processes a session in the IMS network. Namely, the S-SCSF, an entity playing the role of routing signaling, routes a session in the IMS network. The I-CSCF operates as an access point with a different entity in the IMS network.

2) Under the foregoing IMS, an IP-based session is controlled by an SIP (Session Initiation Protocol). The SIP, a protocol for controlling a session, refers to a signaling protocol specifying a procedure for terminals that want to perform communication to identify each other, find their locations, and generate a multimedia session therebetween or delete or change a generated session. In order to discriminate each user from one another, the SIP uses an SIP URI (Uniform Resource Identifier) similar to an e-mail address, thus providing a service without being dependent on an IP (Internet Protocol) address.

3) Registration: It refers to a process for a UE to provide information regarding a current location thereof to a home network. Namely, it refers to a process for the UE to transmit its current location and other information to access the home network.

4) AS (Application Server): A server providing various multimedia services

5) Multimedia session continuity: It refers to supporting UE mobility or mobility between UEs, while maintaining continuity with respect to ongoing session.

6) SCC AS (Service Centralization and Continuity Application Server): An application server supporting multimedia session continuity (Please see [3GPP TS 23.237 v10.4.1]).

7) Collaborative session: a logical set of an IMS session over two or more terminals, which is anchored on the SCC AS so as to be combined into a single IMS session.

8) A controller UE: A UE that controls the collaborative session. A service profile of the controller UE determines a service with respect to a remote leg to a remote end (or a remote party) as a communication counterpart of the collaborative session. The controller UE may provide a media flow for the collaborative session. Also, the controller UE may request an IUT media control related procedure (Please see [3GPP TS 23.237 v10.4.1])

9) Controllee UE: A UE that provides a media flow for the collaborative session. The controllee UE may request an IUT media control related procedure, and in this case, authorization (or authentication) with respect to this request is dependent upon the controller UE. A plurality of controllee UEs may exist (Please see [3GPP TS 23.237 v10.4.1])

10) Remote end: A counterpart UE or a counterpart application server which communicates with a UE.

11) IUT (Inter-UE Transfer): It refers to transfer (or move or copy) a portion or the entirety of a media flow within a session and/or authority to control service between terminals.

12) Hosting SCC AS: An application server supporting multimedia session continuity. It allows for performing of collaborative session between a remote end and one or more UEs in order to maintain session continuity, and manages a dialog with the remote end.

13) IUT media control related procedure: It includes an operation of controlling a media flow within a collaborative session and a control operation that requires authorization of a controller UE within the collaborative session, e.g., ability to transfer/add/copy media flow or ability to remove/correct a media flow performed by a different UE (Please see [3GPP TS 23.237 v10.4.1]).

14) Collaborative session control: It is a control operation that may be performed only by a controller UE in a collaborative session, which is also called authority to control a collaborative session. For example, it refers to ability to release a collaborative session, call supplementary service, and authorize a request for IUT media control related procedure from a different UE (Please see [3GPP TS 23.237 v10.4.1])

15) MRF (Multimedia Resource Function): It includes an MRFC (Multimedia Resource Function Controller) and MRFP (Multimedia Resource Function Processor). The MRF is an IP media sever that controls a media streaming function. A message is exchanged through an Mp interface or reference point between the MRFC and the MRFP, and the Mp interface perfectly supports an ITU-T H.248 (Gateway Control Protocol). The MRF is described in detail in Paragraph 4.7 (multimedia resource function), 3GPP TS 23.228 v10.3.1, of standard document, so it will not be described and corresponding content will be claimed.

16) MRFP (Multimedia Resource Function Processor): It performs the following operations.
Bearer controlling
Providing resource controlled by MRFC
Mixing incoming media streams (e.g., mixing media streams for a plurality of communication counterparts)
Media stream source (e.g., for multimedia announcement)
Media stream processing (e.g., audio transcoding, media analysis)
Management of authority to access shared media in conferencing environment (e.g., floor control)

17) MRFC (Multimedia Resource Function Controller): MRFC performs following operations.
Control media stream resource of MRFP
Interpret information (e.g., a session identifier) received from an application server and an S-CSCF, and control MRFP accordingly
generate Charging Data Records (CDRs)
advanced control (e.g., floor control) with respect to conference So far, terms used in the present disclosure have been defined.

Hereinafter, a concept thereof will be briefly mentioned in order to help understand the method proposed in the present disclosure.

Description of Concept of Method Proposed in Present Disclosure

In a first embodiment of the present invention, the entirety or a portion of media among one or more media within a session being performed by a particular UE with a remote end may be copied to a different UE, thus allowing the media to be shared by several UEs.

In the first embodiment, in case that the entirety or a portion of the session performed by the particular UE is copied to a different UE, it is required to clarify which of the user is to control the media. Thus, in the second embodiment of the present invention, a method for controlling coped media is proposed. Also, when UEs sharing the media requests controlling the media with different intentions simultaneously or sequentially, respectively, the requests may collide. Thus, in the second embodiment of the present invention, authority to control is controlled so that the shared media can be properly controlled.

In the second embodiment of the present invention, a method for controlling shared media or a method for applying the shared media according to the controlling when the entirety or a portion of media of a session performed by a particular UE is shared by a different UE is provided.

Meanwhile, in the second embodiment, all the UEs sharing media can control media of some UEs, as well as performing the same media controlling. For example, when UE-1, UE-2, and UE-3 share video media, the UE-1 may request playback control only for the video media of the UE-1, UE-2, and UE-3.

The present invention will be described with reference to the accompanying drawings. However, hereinafter, a method proposed in the present invention will be preponderantly and other content will not be described in detail. However, although not described, it does not mean that it is excluded from the present disclosure and should be construed to be included in the present disclosure.

Hereinafter, embodiments of the present invention will be described in detail with reference to the accompanying drawings.

Figure 2:
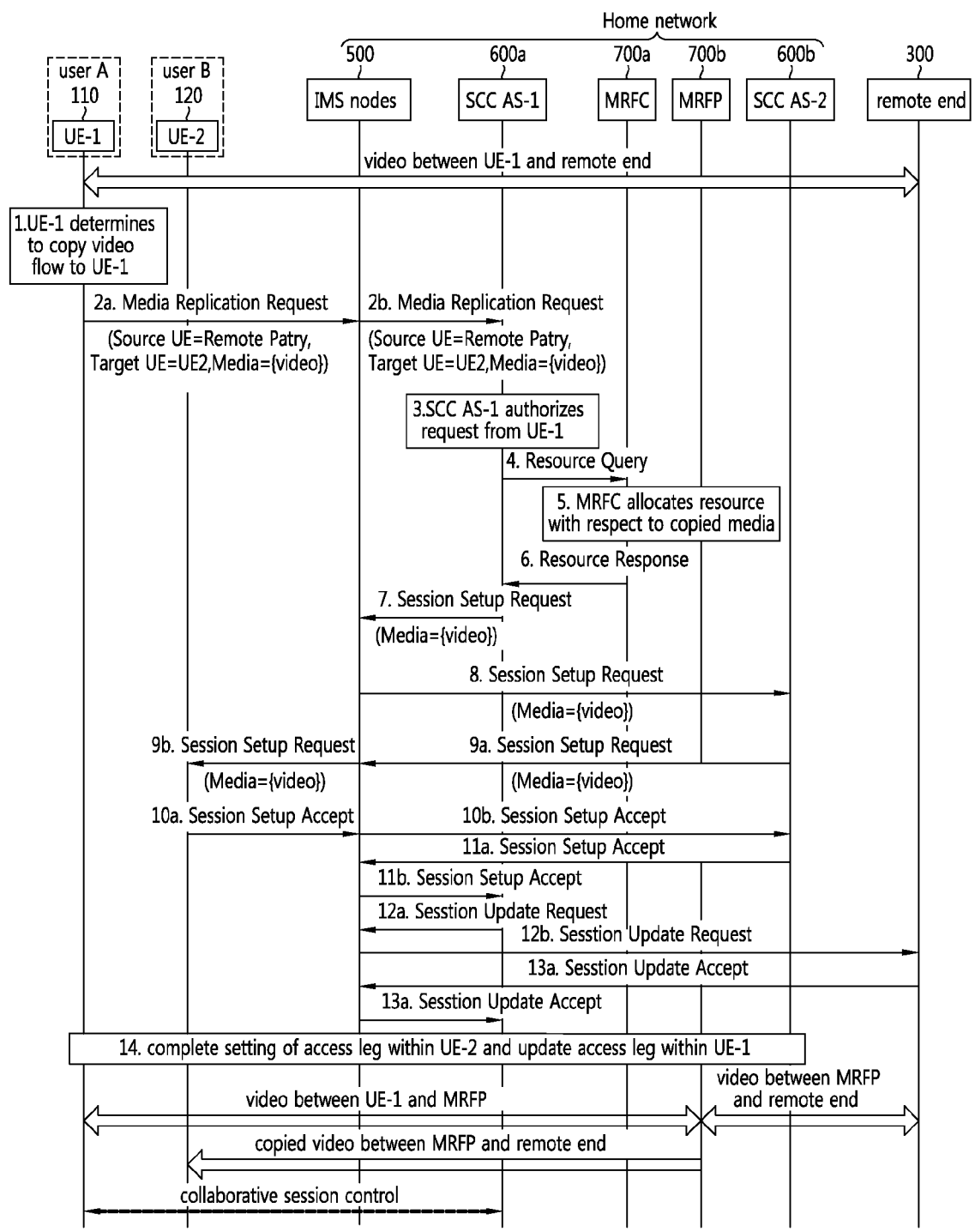
FIG. 2 is a view illustrating a process of copying one or more media constituting a session to a different terminal according to a first embodiment.

FIG. 2 is a view illustrating a process of copying one or more media constituting a session to a different terminal according to a first embodiment.

It is assumed that UE-1 is a terminal belonging to a user A and UE-2 120 is a terminal belonging to a user B in FIG. 2. In FIG. 2, home networks to which the users have subscribed are illustrated. The home networks include an IMS (IP Multimedia Subsystem) node 500, a first SCC AS (SCC AS-1) 600a serving terminals of the user A, and a second SCC AS (SCC AS-2) 600b serving terminals of the user B.

Referring to FIG. 2, in a state in which the user A is performing a session including video media with a remote end 300 by using the UE-1 110, the user A requests the first SCC AS 600a of the IMS network to copy a video media flow to the UE-2 120 owned by the user B. When the video media flow is copied to the UE-2 120 in response to the request, the session is changed into a collaborative session performed by the UE-1 110 and the UE-2 120. Details thereof will be described with reference to FIG. 2 as follows.

1) In a state in which the user A is performing a session including video media with the remote end 300 by using the UE-1 110, the user A determines to copy a video media flow of the UE-1 110 to the UE-2 120.

2a~2b) In order to request copying of the video media flow to the UE-2 120, the UE-1 110 transmits a media sharing request message, e.g., a copy request message, i.e., a media replication request message (e.g., an SIP-based REFER message), to the SCC AS-1 600a.

3) The SCC AS-1 600a authorizes or verifies the media sharing request message, e.g., the copy request message, from the UE-1 110. Such authorization or verification may be performed based on subscriber information. The authorization or verification may be verification as to whether or not the UE-1 110 is allowed for the request. Or, the authorization or verification may be verification as to whether or not media of the UE-1 110 can be copied to the UE-2 120, or the like.

4) The SCC AS-1 600a transmits a request message, i.e., resource query message, for obtaining information regarding resource required for copying video media to an MRFC 700a based on the media sharing request message, i.e., the copy request message.

5) Upon receiving the resource query message from the SCC AS-1 600a, the MRFC 700a allocates media resource for video media to be copied to an MRFP 700b. Such a resource allocation operation includes allocation of one or more media ports and port numbers required for the MRFP 700b to generate a session or a bearer of a user plane with the remote end 300, the UE-1 110, and the UE-2 120.

6) The MRFC 700a transmits a response message, i.e., a resource response message, including information regarding resource required for copying video media to the SCC AS-1 600a. The resource response message includes an IP address of the MRFP 700b and one or more of the media ports and the port numbers allocated in step 5.

7) The SCC AS-1 600a transmits a session setup request message (e.g., an SIP-based INVITE message) for setting up a session including video media between the UE-2 120 and the MRFP 700b to the UE-2 120 based on the Resource Response message.

8) Upon receiving the session setup request message from the SCC AS-1 600a, the IMS node 500 routes the message to the UE-2 120. Thus, the message is transferred to the SCC AS-2 600b serving the UE-2 120. The SCC AS-2 600b may authorize or verify the session setup request message. The authorization or verification may be performed based on subscriber information. This is similar to the foregoing content, so the foregoing content will be applied without a detailed description.

9a~9b) Upon receiving the Session Setup Request message, the SCC AS-2 600b forwards the message to the UE-2 120.

10a~10b) The UE-2 120 transmits an accept message, i.e., a Session Setup Accept message (e.g., an SIP-based 200 OK message), with respect to the Session Setup Request message to the SCC AS-2 600b through the IMS node 500.

11a~11b) The SCC AS-2 600b forwards the accept message, i.e., the Session Setup Accept message, to the SCC AS-1 600a.

12a~12b) Upon receiving the Session Setup Accept message from the UE-2 120, the SCC AS-1 600a transmits a session change request message, e.g., a Session Update Request message, including a matter to be changed according to the copying of the video media flow, too the remote end 300 through the IMS node 500.

13a~13b) Upon receiving the Session Update Request message, the remote end 300 transmits the Session Update Accept message in response to the session change request from the SCC AS-1 600a. Accordingly, a session made up of video media is set up between the MRFP 700b and the remote end 300.

14) The SCC AS-1 600a completes a path, e.g., Access Leg, with the UE-2 120, and updates a path, e.g., Access Leg, of the UE-1 110. Thus, a video media flow is formed from the MRFP 700b to the UE-2 120 between the UE-1 110 and the MRFP 700b. The path establishment may be performed before the session change request message is transmitted (i.e., immediate after the step 11b)

Due to the media copying operation, the session is changed into a collaborative session. In the collaborative session, the UE-1 110 is a controller UE and the UE-2 120 is a controllee UE. In this case, the hosting SCC AS with respect to the formed collaborative session is the SCC AS-1 600a serving the UE-1 110 as a controller UE.

As noted so far, the original counterpart node providing the video media to the UE-1 is the remote end 300, but a counterpart node providing the video media to the UE-1 as a result of sharing the video media with the UE-2 is the MRFP 700b.

Meanwhile, so far, the process in which the UE (i.e., the UE-1) performing the session including media requests copying of the corresponding media within the session to a different UE (i.e., the UE-2) has been described, but differently, a UE (i.e., the UE-2) that does not perform a session including media may request the UE (i.e., the UE-1) that is performing a session including the media to copy the media. Meanwhile, details of media copying by the IMS network are described in 6a.10 Paragraph (Media Flow Replication by network) of 3GPP TS 23.237 v10.4.1 in standard document, so an additional description is omitted and the corresponding content will be quoted.

Also, so far, it has been described that media within a session is copied and transferred to a plurality of UEs in the IMS network, and thus, media is shared, but differently, the remote end may copy the media within the session and transfer the same to several UEs. Details of copying by the remote end are described in 6a.11 Paragraph (Session Replication by remote party) of 3GPP TS 23.237 v10.4.1 in standard document, so the corresponding content is quoted. According to the standard document, in case of copying by a remote end, a collaborative session is not generated but a separate session is generated due to copying of media. However, in order to allow users owning the terminals having copied media to experience the same media, synchronization may be performed between the existing session and the session separately generated by the remote end. Namely, through session synchronization, an effect as if the users share the media may be obtained.

The first embodiment described so far is related to sharing of media by forming a collaborative session by several UEs. However, with respect to the shared media, a fact that which UE is to control the media has not been defined.

Also, the media provided to the UE-1 by the remote end is copied to the second UE according to the first embodiment, but how to control the media in case the remote end does not have a playback control function with respect to the copied media has not been specified. If the remote end does not provide a playback control function with respect to the copied media, it is impossible to control such that playback of the coped media is performed uniformly in UE-1 and UE-2. Although the remote end provides the playback control function with respect to the copied media, it is impossible to reproduce media of any one of the UE-1 and UE-2.

Meanwhile, the IUT allows for controlling media, but media controlling in the IUT aims at generating a collaborative session by transferring, correcting, copying, and deleting media within a session.

However, the main purpose of sharing media is to share media provided to one UE with a different UE to provide the same experience, so the media is required to be controlled including playing, pausing, resuming, stopping, fast forwarding, rewinding, fast rewinding.

Hereinafter, a method and procedure for controlling media of UE-1 and UE-2 such that users of the UE-1 and UE-2 have the same experience will be described according to the second embodiment.

In addition, since such a method and procedure may be mainly performed by the hosting SCC AS, so hereinafter, the operation of the hosting SCC AS will be largely described.

Figure 3:
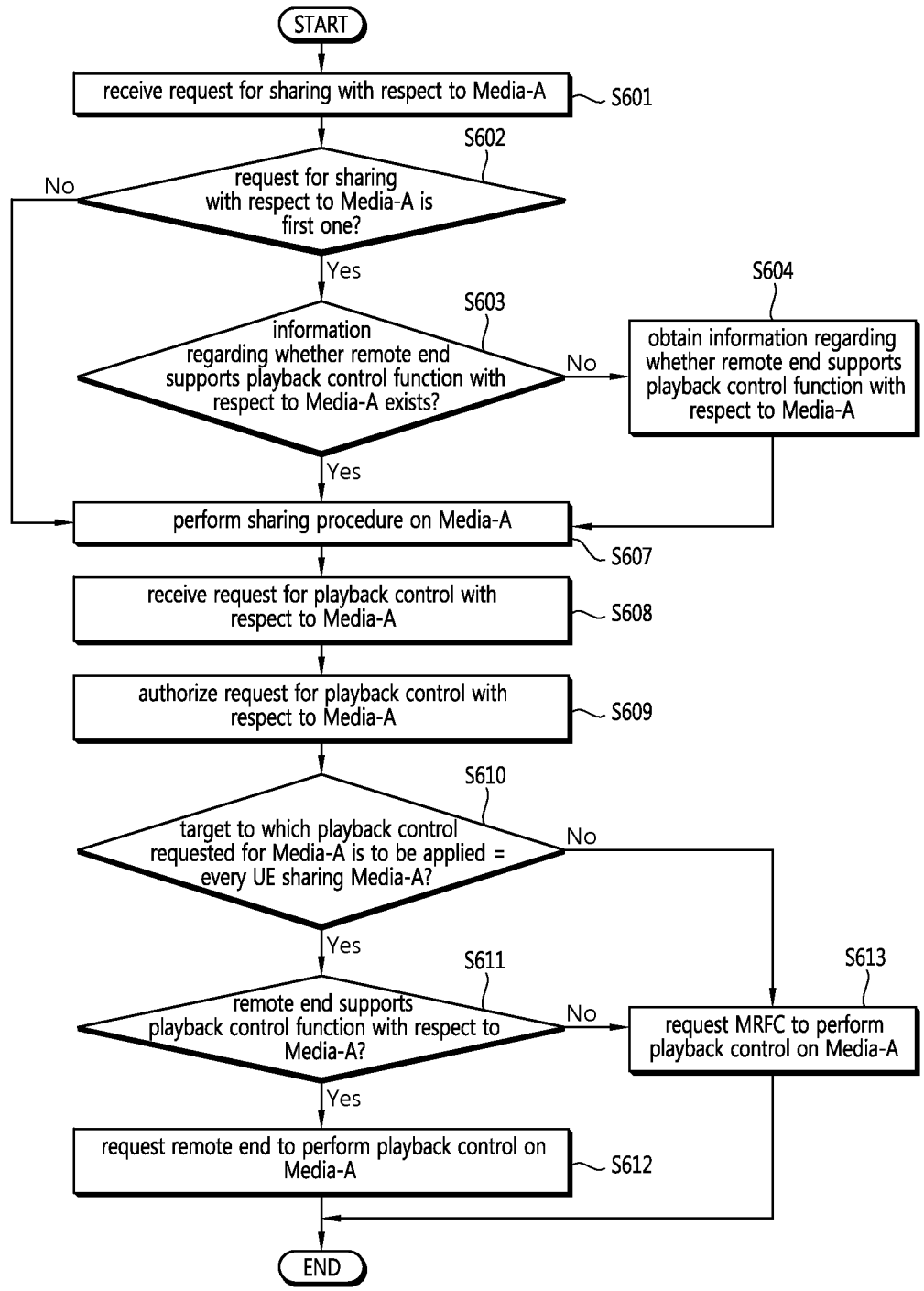
FIG. 3 is a flow chart illustrating an operation of a hosting SCC AS according to a second embodiment in order to allow for controlling of shared media.

FIG. 3 is a flow chart illustrating an operation of a hosting SCC AS according to a second embodiment in order to allow for controlling of shared media.

The hosting SCC AS receives a media sharing request message with respect to media within a session performed by the UE-1 110 or the UE-2 120 with the remote end 300 (S601). As described above, the media sharing request message may be, for example, a media copying request message, i.e., Media Replication Request message.

Meanwhile, the media sharing request message, e.g., the Media Replication Request message may include information indicating who is a playback control master with respect to the shared media. When the information indicating the master is included, the hosting SCC AS stores the information.

The hosting SCC AS may receive media sharing request according to one of the following scenarios.

In a state in which the UE-1 110 is performing a session including media of Media-A with the remote end 300, the UE-1 110 requests that it should share Media-A within the session with the UE-2 120 from the SCC AS-1 600a serving the UE-1 110. Here, the UE-1 110 requests that it should be a controller UE with respect to the collaborative session formed as a result of sharing the media. Thus, the SCC AS-1 600a becomes a hosting SCC AS of the collaborative session.

In a state in which the UE-1 110 is performing a session including media of Media-A with the remote end 300, the UE-1 110 requests that it should share Media-A with the UE-2 120 from the SCC AS-1 600a. Here, the UE-1 110 requests that the UE-2 120 should become a controller UE with respect to the collaborative session formed as a result of sharing media. Thus, the SCC AS-2 600b serving the UE-2 120 becomes a hosting SCC AS of the collaborative session (which also includes a case in which the SCC AS-1 serving the UE-1 110 and the SCC AS-2 serving the UE-2 120 are the same).

In a state in which the UE-1 110 is performing a session including media of Media-A with the remote end 300, the UE-2 120 requests that Media-A of the UE-1 110 should be shared with the UE-2 120 from the SCC AS-2 600b serving the UE-2 120. Here, the UE-2 120 requests that it should become a controller UE with respect to a collaborative session formed as a result of sharing the media. Thus, the SCC AS-2 600b becomes a hosting SCC AS of the collaborative session.

In a state in which the UE-1 110 is performing a session including media of Media-A with the remote end 300, the UE-2 120 requests that Media-A of the UE-1 110 should be shared with the UE-2 120 from the SCC AS-2 600b serving the UE-2 120. Here, the UE-2 120 requests that the UE-1 110 should become a controller UE with respect to a collaborative session formed as a result of sharing the media. Thus, the SSC AS-1 600a serving the UE-1 110 becomes a hosting SCC AS of the collaborative session (which also includes a case in which the SCC AS-1 serving the UE-1 110 and the SCC AS-2 serving the UE-2 120 are the same).

In a state in which the UE-1 110 as a controller UE of the collaborative session is performing a session including media of Media-A with the remote end 300, the UE-1 110 requests that it should share Media-A with the UE-2 120 from the SSC AS-1 600a (i.e., the hosting SCC AS) serving the UE-1 110. In this case, the UE-2 120 may be a UE already belonging to the collaborative session or may not. In the latter case, the UE-2 120 becomes a controllee UE constituting the collaborative session due to the sharing of the media.

As mentioned above, the hosting SCC AS may be the SCC AS-1 600a or the SCC AS-2 600b. Thus, hereinafter, reference numeral 600 will be used to denote the hosting SCC AS.

Upon receiving the request for sharing the media, the hosting SCC AS 600 checks whether or not the request is a first request with respect to Media-A (S602).

The hosting SCC AS 600 determines whether or not the remote end 300 stores information regarding whether it supports a playback control function with respect to Media-A (S603).

When the remote end 300 does not have the information, the hosting SCC AS 600 obtains the information (S604). Here, the hosting SCC AS 600 may obtain the information through one of the following methods.

First, the hosting SCC AS 600 may obtain the information through an SIP message transmitted or received for path updating, e.g., Remote Leg Update, to inform the remote end 300 about matters related Media-A as a part of a sharing procedure with respect to Media-A.

Second, the hosting SCC AS 600 may obtain the information through message exchange used to obtain capability information such as an SIP OPTIONS message from the remote end.

In response to the request for sharing the media, the hosting SCC AS 600 performs a procedure for sharing media (S607). Accordingly, a new counterpart node with respect to the shared Media-A is the MRFP 700b and the MRFP 700b is controlled by the MRFC 700a as mentioned above. Here, resource of the MRFP 700b controlled by the MRFC 700a is used to share Media-A, but the present invention is not limited thereto. Also, apart from the node providing resource for sharing Media-A, a node for controlling playback (e.g., a media streaming server, a streaming adapter, a media gateway, etc.) may be separately operated.

Media-A may be shared by a plurality of UEs including the UE-1 110 and the UE-2 120 according to various scenarios as mentioned in step S601. In the following description, it is assumed that the UE-1 110 and the UE-2 120 share Media-A for the description purpose.

The hosting SCC AS 600 receives a playback control request with respect to Media-A (S608). Here, the playback control request is received from a certain UE sharing the Media-A. For example, it may be received from the UE-1 110 or the UE-2 120.

The hosting SCC AS 600 may perform a procedure of authorizing the playback control request with respect to the Media-A (S609). Namely, when the certain UE which has transmitted the playback control request is not a master of playback control with respect to the Media-A, the hosting SCC AS 600 requests a UE as a master of the playback control to authorize the request. When it has been set such that the authorization should not be requested from the master UE (which has been set according to user preference or an operator policy), the hosting SCC AS 600 directly performs authorization. Such authorization allows the hosting SCC AS 600 to verify whether or not the UE which has requested the playback control operation is a UE permitted for the request, and in this case, one or more of the following determination references may be used in performing verification. Which of the following references is to be used may be based on an operator policy and/or user preference.

When the certain UE is a controller UE: When the UE which has requested the playback control is a controller UE of the collaborative session including the media When the certain UE is a controller capable UE: When the UE, which has requested the playback control, is a UE that belongs to the collaborative session including the media and has capability as a controller UE. In this case, the UE may be a controller UE or a controllee UE, but it may become a controller UE through IUT of the collaborative session control. Information indicating whether or not the UE is a controller capable UE may be obtained as follows: i) the UE informs the IMS network about it when the UE performs registration, ii) the UE informs the IMS network about it when the UE generates a session, iii) the UE informs the IMS network about it when the UE requests IUT, or iv) the information may be obtained from subscriber information to which the UE belongs.

When the certain UE is an IUT capable UE: When the UE, which has requested the playback control, is a UE that belongs to the collaborative session including the media subjected to playback control, which has capability of performing an IUT media control related procedure. Information indicating whether or not the UE is an IUT capable UE may be obtained as follows: i) the UE informs the IMS network about it when the UE performs registration, ii) the UE informs the IMS network about it when the UE generates a session, iii) the UE informs the IMS network about it when the UE requests IUT, or iv) the information may be obtained from subscriber information to which the UE belongs.

When the UE is a playback control capable UE: When the UE, which has requested playback control, is a UE that belongs to a collaborative session including the media subjected to playback control, which has capability of performing playback control. Namely, whether or not the UE is a controller UE or a controllee UE within a collaborative session does not matter. Also, the UE may be an IUT capable UE or may not. Information indicating whether or not the UE is a playback control capable UE may be obtained as follows: i) the UE informs the IMS network about it when the UE performs registration, ii) the UE informs the IMS network about it when the UE generates a session, iii) the UE informs the IMS network about it when the UE requests IUT, iv) the UE is a target of an IUT so it informs the IMS network about it when IUT operation is performed, or v) the information may be obtained from subscriber information to which the UE belongs.

When the UE explicitly informs the IMS network that it performs playback control with respect to particular media. Such an explicit notification may be provided as follows: i) it may be recorded in subscriber information to which the UE belongs, ii) when the UE performs registration, iii) when the UE requests media share, iv) it may be designated by a different UE or IMS network in generating a session for shared media, and v) it may be designated by a different UE or IMS network through message exchange aside from generation of a session for shared media. For example, in case that the operator policy permits only a controller UE to request playback control (namely, it corresponds to 1), when a controllee UE requests playback control, the hosting SCC AS does not permit the request.

When the authorization is completed (S607), the hosting SCC AS 600 inspects whether or not a target to which the playback control requested for the Media-A is to be applied is all the UEs, e.g., the UE-1 110 and the UE-2 120, sharing the Media-A (S610).

When the target to which the requested playback control is to be applied is all the UEs sharing the Media-A, the hosting SCC AS 600 inspects whether or not the remote end 300 as the original counterpart node of the Media-A supports the playback control function with respect to the Media-A (S611). For this inspection, the stored (S603 or S604) information may be used.

When the remote end 300 supports the playback control function with respect to the Media-A, the hosting SCC AS 600 requests the remote end as the original counterpart node of the Media-A to perform playback control (S612).

Meanwhile, if all of the UEs are the targets to which the playback control requested for the Media-A is to be applied but the remote end 300 does not support the playback control function with respect to the Media-A, the hosting SCC AS 600 may request the MRFC 700a, which controls the MRFP 700b as a new counterpart node of the Media-A, to perform the playback control.

Here, the hosting SCC AS 600 transfers a playback control request message including information regarding all the target UEs to which the playback control is to be applied, to thus request the MRFC 700a to perform playback control on all of the UEs at a time, or may request the MRFC 700A to perform playback control separately on each UE to which playback control is to be applied. Upon receiving the request for playback control from the hosting SCC AS 600, the MRFC performs playback control through interaction with the MRFP. Such an interaction may be based on an existing protocol such as H.248 defined for interaction between the MRFC and the MRFP, based on an existing protocol such as an SIP, or may be based on a new protocol defined in an embodiment of the present invention.

Meanwhile, when the targets to which the playback control requested for the Media-A are all of the UEs and the remote end 300 does not support the playback control function with respect to the Media-A, the hosting SCC AS 600 may perform Remote Leg Update with respect to the Media-A to the remote end, as necessary.

So far, it has been described that the UEs sharing the Media-A request playback control, but the present invention is not limited thereto. For example, even a different UE not sharing the Media-A may request the playback control. Namely, the UE requesting playback control may belong to the collaborative session including the Media-A or may not. For example, when the UE-1 and the UE-2 share the Media-A, the playback control request may be made by the UE-3. Here, all of the UE-1, UE-2, and UE-3 may belong to the collaborative session or only UE-1 and UE-2 may belong to the collaborative session.

Also, the method for requesting the playback control by the UE with respect to shared media may also be applicable even to media not shared in the collaborative session. Namely, although it is not within the category of the IUT or not shared media, the method may be applicable to media constituting an IMS session.

Also, the content described so far may be applicable as it is or in a deformed format to a multicast media stream, as well as to a unicast media stream. Also, in order to realize the content described so far, a counterpart node (e.g., the remote end 300 or the MRFP 700b) of media with respect to the UE or a node that plays a proxy role with respect to a counterpart node of the media is required to provide a buffering function to perform playback control.

Figure 4A:
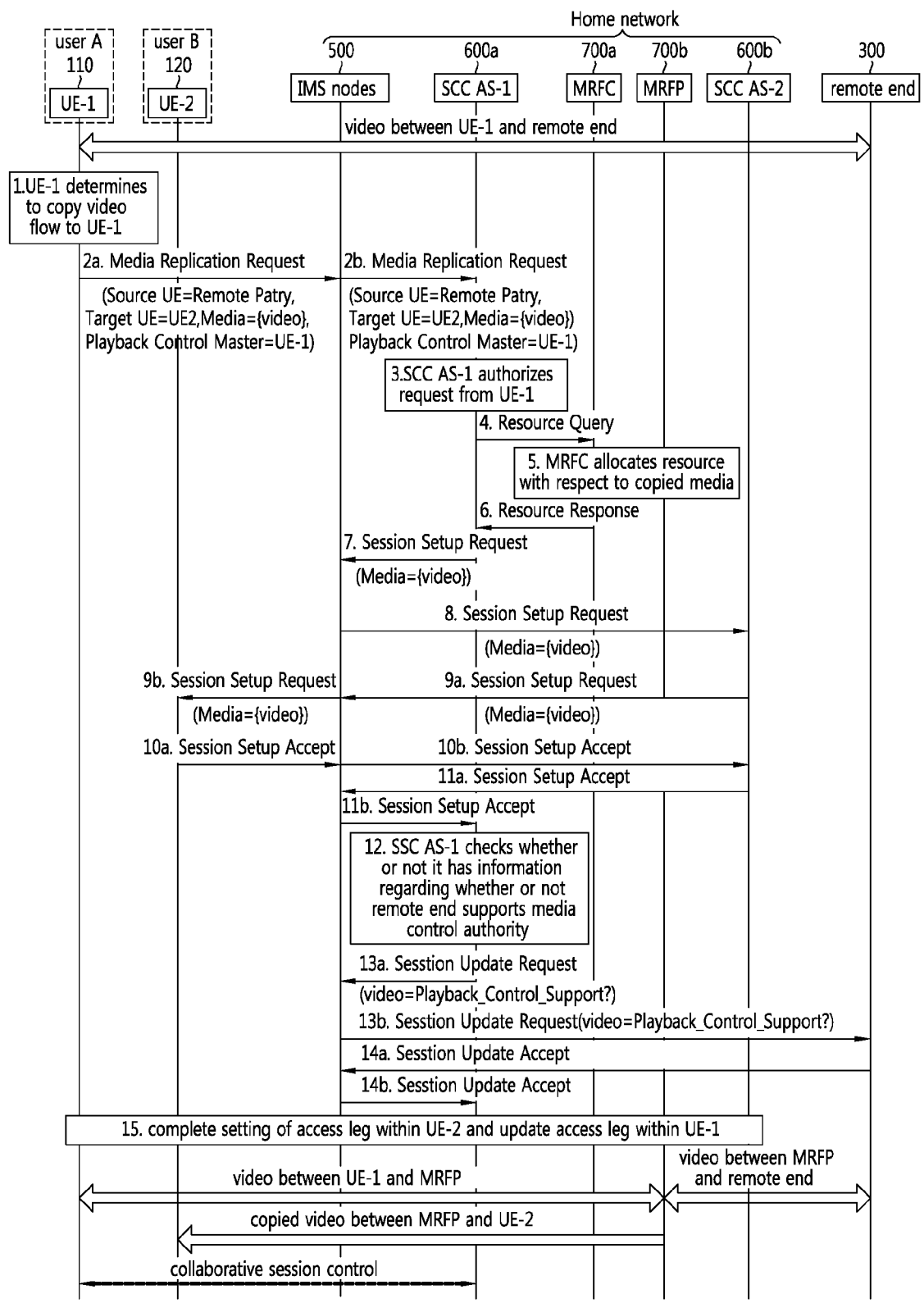
FIGS. 4A and 4B are signal flow charts illustrating a specified operation of FIG. 3.
Figure 4B:
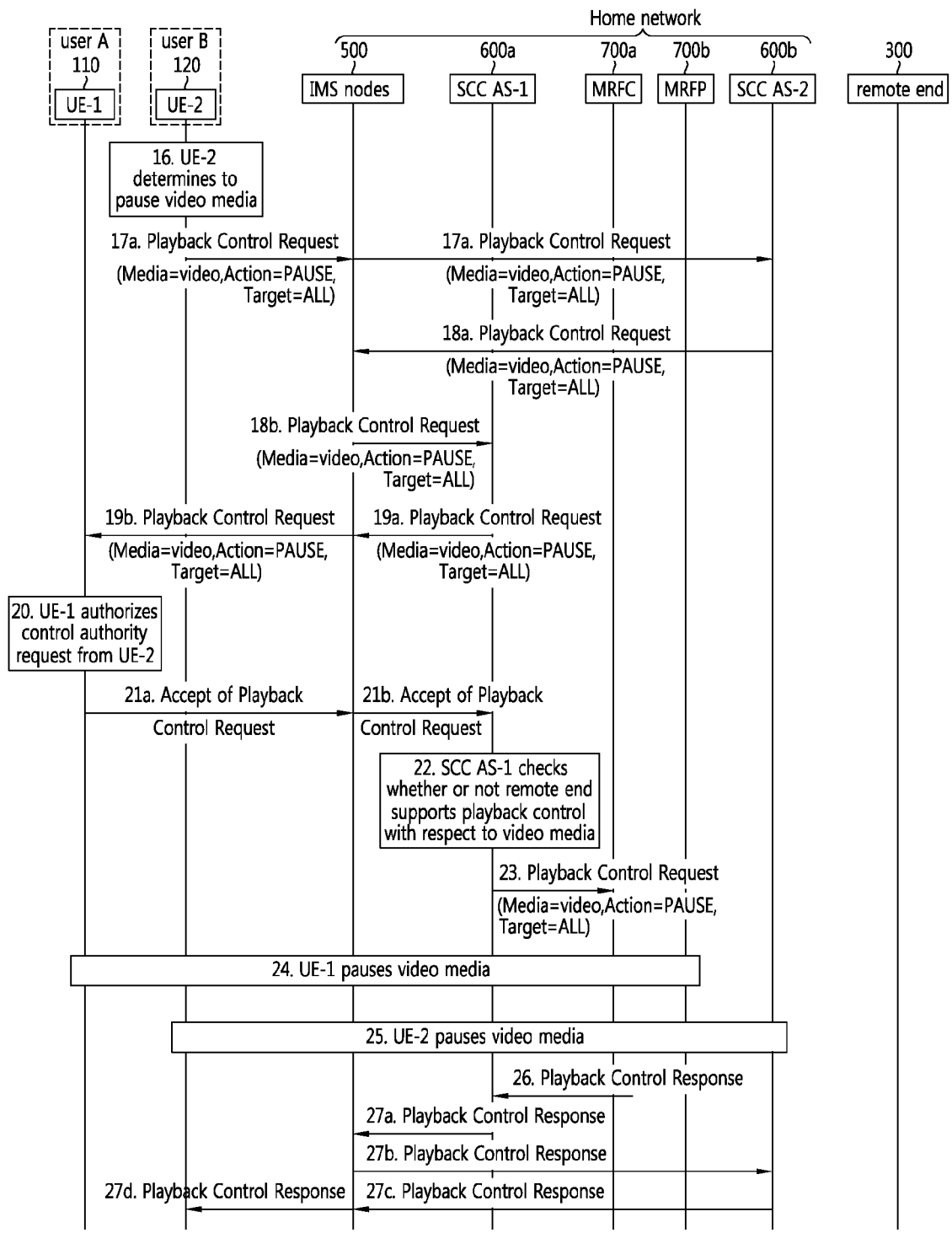

FIGS. 4A and 4B are signal flow charts illustrating a specified operation of FIG. 3.

FIG. 4 shows an operation of playback control with respect to shared media within a collaborative session. In particular, FIG. 4 shows a situation in which a UE, which is a controllee UE with respect to shared media within a collaborative session and not a playback control master, requests playback control, and in this case, the UE requests playback control through an SIP session generated for media.

Also, in FIG. 4, the user A owns the UE-1 110 and the user B owns the UE-2 120. However, it is merely illustrative and the description hereinafter may be applicable in the same manner even when it is assumed that the user A owns both the UE-1 and the UE-2.

In FIG. 4, a home network to which the user A and the user B have been subscribed is illustrated. The home network includes the IMS (IP Multimedia Subsystem) node 500, the SCC AS (SCC AS-1) 600a serving the UE-1 110, and the SCC AS (SCC AS-2) 600b serving the UE-2 120. In the case of the IMS node 500 including the S-CSCF, although not specifically shown in FIG. 4, the same S-CSCF may serve both of the UE-1 110 and the UE-2 120, and the S-CSCF serving the UE-1 110 and the S-CSCF serving the UE-2 120 may be different (for example, the S-CSCF-1 may serve the UE-1 belonging to the user A, and the S-CSCF-2 may serve the UE-2 belonging to the user B).

In FIG. 4, it is assumed that the user A is performing a session including video media with the remote end 300 through the UE-1 110 and the remote end 300 does not support a playback control function with respect to the video media.

1) In a state in which the user A is performing the session including video media with the remote end 300 by using the UE-1 110, he determines to copy a video media flow of the UE-1 110 to the UE-2 120.

2a~2b) In order to request copying of the video media flow to the UE-2 120, the UE-1 110 transmits a media sharing request message, e.g., a media replication request message (e.g., an SIP-based REFER message) to the SCC AS-1 600a. Here, the UE-1 110 may include information indicating which terminal is a playback control master with respect to the video media to be shared with the UE-2 120 from copying, in the media sharing request message, e.g., the media replication request message. In FIG. 4, the UE-1 110 wants to be a playback control master with respect to the video media, and the UE-1 110 includes information (expressed as 'Playback Control Master=UE-1' in FIG. 4) indicating that in the Media Replication Request message.

3) The SCC AS-1 600a authorizes or verifies the media sharing request message, e.g., the copy request message, from the UE-1 110. Such authorization or verification may be performed based on subscriber information. The authorization or verification may be verification as to whether or not the UE-1 110 is allowed for the request. Or, the authorization or verification may be verification as to whether or not media of the UE-1 110 can be copied to the UE-2 120, or the like. The SCC AS-1 600a stores information regarding the playback control master included in the media sharing request message, e.g., the media replication request message, and ascertains whether or not the playback control master with respect to the video media shared from copying is the UE-1 110. If the media sharing request message, e.g., the media replication request message, does not have information explicitly indicating the master of the playback control, the SCC AS-1 600a may set a mater of playback control based on user preference or operator policy. In the case of user preference or operator policy, a UE, which has requested media copying, may be set as a controller UE of a collaborative session formed from media copying as a playback control master or the hosting SCC AS 600, not a UE, may be set as a playback control master.

4) The SCC AS-1 600a transmits a request message, i.e., resource query message, for obtaining information regarding resource required for copying video media to an MRFC 700a based on the media sharing request message, i.e., the copy request message.

5) Upon receiving the resource query message from the SCC AS-1 600a, the MRFC 700a allocates media resource for video media to be copied to an MRFP 700b. Such a resource allocation operation includes allocation of media port numbers required for the MRFP 700b to configure a bearer of a user plane with the remote end 300, the UE-1 110, and the UE-2 120.

6) The MRFC 700a transmits a response message, i.e., a resource response message, including information regarding resource required for copying video media to the SCC AS-1

600a. The resource response message includes an IP address of the MRFP 700b and the media port numbers allocated in step 5.

7) The SCC AS-1 600a transmits a session setup request message (e.g., an SIP-based INVITE message) for setting up a session including video media between the UE-2 120 and the MRFP 700b to the UE-2 120 based on the Resource Response message. Here, the session setup request message, i.e., Session Setup Request message, may include information indicating that the video media is copied, to the UE-2 120.

8) Upon receiving the session setup request message, i.e., Session Setup Request message, from the SCC AS-1 600a, the IMS node 500 routes the message to the UE-2 120. Thus, the message is transferred to the SCC AS-2 600b serving the UE-2 120. The SCC AS-2 600b may authorize or verify the session setup request message. The authorization or verification may be performed based on subscriber information. This is similar to the foregoing content, so the foregoing content will be applied without a detailed description.

9a~9b) Upon receiving the session setup request message, i.e., the Session Setup Request message, the SCC AS-2 600b forwards the message to the UE-2 120.

10a~10b) The UE-2 120 transmits an accept message, i.e., a Session Setup Accept message (e.g., an SIP-based 200 OK message), with respect to the Session Setup Request message to the SCC AS-2 600b through the IMS node 500.

11a~11b) The SCC AS-2 600b forwards the accept message, i.e., the Session Setup Accept message, to the SCC AS-1 600a.

12) Upon receiving the Session Setup Accept message from the UE-2 120, the SCC AS-1 600a checks whether or not it has information regarding whether or not the remote end 300 provides the playback control function with respect to the video media as copied media. In FIG. 4, it is assumed that the SCC AS-1 600a doest not have information regarding whether or not the remote end 300 provides the playback control function with respect to the video media as copied media. For reference, the information may be provided by stating that the remote end 300 supports the playback control function with respect to the video media, within an SIP header or an SDP message when the session including the video media is generated between the UE-1 110 and the remote end 300.

13a~13b) The SCC AS-1 600a transmits a session change request message, e.g., Session Update Request message (e.g., an SIP-based Re-INVITE message), including a changed matter according to the copying of the video media flow, to the remote end 300 through the IMS node 500. Here, the SCC AS-1 600a includes information (e.g., a parameter, an element, or an indicator) (expressed as 'video=Playback_Control_Support?' in FIG. 4) for inquiring as to whether or not the remote end 300 has capability to provide the playback control function with respect to the media requested to be shared, in the Session Update Request message. Such a query information (a parameter, an element, or an indicator) may be included in an SIP header or an SDP message.

14a) Upon receiving the session change request message, i.e., the Session Update Request message, the remote end 300 transmits a session change accept message, i.e., Session Update Access message (e.g., an SIP-based 200 OK message) in response to the change update request from the SCC AS-1 600a. In this case, since the remote end 300 does not support the playback control function with respect to the video media as assumed above, information regarding the corresponding fact may be provided through the session change accept message, i.e., Session Update Accept message. In FIG. 4, by not including explicit information in relation to the capability to provide the playback control function with respect to the media requested to be shared, the fact that the remote end 300 does not support the function may be informed. Alternatively, by explicitly including information (e.g., it is included in the form of, for example, 'video: Playback_Control_Support=NO' in the SIP header or the SDP message), the fact that the remote end 300 does not support the playback control function with respect to the video media may be informed. If the remote end 300 fails to interpret (or understand) the query information regarding whether or not it supports the playback control function with respect to the video media included in the received Session Update Request message, the remote end 300 disregards the query information. This results in that the SCC AS-1 600a interprets that the remote end 300 does not support the playback control function with respect to the video media.

14b) The session change accept message, i.e., the Session Update Accept message, transmitted by the remote end 300 is delivered to the SCC AS-1 600a through the IMS node 500. Accordingly, a session including the video media is set up between the MRFP 700b and the remote end 300.

15) The SCC AS-1 600a completes setting of Access Leg of the UE-2 120, and updates Access Leg of the UE-1 110. Accordingly, a video media flow is formed from the MRFP 700b to the UE-2 120 between the UE-1 110 and the MRFP 700b. Due to the media copying operation, a collaborative session in which the UE-1 110 is a controller UE and the UE-2 120 is a controllee UE is formed. Also, the hosting SCC AS with respect to the formed collaborative session is the SCC AS-1 600a serving the UE-1 110 as a controller UE.

16) The UE-2 120 determines to perform pause, one of playback control operations with respect to all the UEs that share the video media.

17a~17b) In order to request pausing of the video media flow, the UE-2 120 transmits a playback control request message, i.e., Playback Control Request message, to the SCC AS-2 600b.

The playback control request message, an SIP message (e.g., existing SIP messages such as Re-INVITE, REFER, UPDATE, and the like, or a newly defined SIP message for playback control), includes information indicating what is a requested playback control operation (e.g., pausing, rewinding, etc.), information regarding media (including a plurality of media) to which control is to be applied, and information regarding a target (e.g., a particular UE(s) or every UE) to which playback control is to be applied. Besides, the playback control request message may further include various parameters required for playback control. For example, when a requested playback control operation is PAUSE, the playback control request message may further include information regarding a time, a position (or point), a frame, or the like, to which pause is applied. Such information may be included by using one or more parameters among a header field of an SIP, a body parameter of the header field of the SIP, a tag of the header field of the SIP, a field of an SDP, and XML (Extensible Markup Language) body, and may use an existing defined parameter or a parameter newly defined in the present embodiment. Also, an SIP message itself requesting the playback control operation may indicate what is a requested playback control operation (e.g., PLAYBACK_PAUSE).

When an existing SIP message is used, an indication (or a tag) indicating that the purpose of a message in use is to request playback control may be added. For example, in case of using an UPDATE message, an existing SIP message, an indication explicitly informing the IMS network that the message has been transmitted in order to request playback control may be added.

When a playback control request is made with respect to a plurality of media at a time, information regarding what is a playback control operation requested for each media and information regarding a target to which playback control is to be applied may be included in the playback control request message. If the playback control operation requested for the plurality of media and the application target are the same, they may be crated as information in a combined format so as to be included.

If an extra playback control request message is used only for a case in which a target to which playback control is to be applied is every UE, there is no need to include information regarding the target to which playback control is to be applied.

In FIG. 4, it is illustrated that the playback control request message includes formats such as Action=PAUSE' indicating what is a requested playback control operation, 'Media=video' indicating information regarding media to which playback control is to be applied, and 'Target=ALL' indicating information regarding a target to which playback control is to be applied.

18a~18b) Upon receiving the playback control request message from the UE-2 120, the SCC AS-2 600*b* forwards the message to the SCC AS-1 600*a* as a hosting SCC AS 600 of the collaborative session to which the UE-2 120 belongs. Thus, the playback control request message is delivered to the SCC AS-1 600*a* through the IMS node 500.

19a~19b) Since the terminal, which has transmitted the playback control request message, is not a playback control master with respect to the video media to which playback control is applied, the SC AS-1 600*a* transfers the request message to the UE-1 110, a playback control master.

20) The UE-1 110 performs authorization on the playback control request.

21a~21b) The UE-1 110 transmits an accept message, i.e., Accept of Playback Control Request message, with respect to the playback control request to the SCC AS-1 600*a*.

22) Since the targets to which playback control is to be applied are all the UEs sharing the video media, the SCC AS-1 600*a* checks whether or not the remote end 300, as the original counterpart node of the video media as media to which playback control is to be applied, provides a playback control function with respect to the video media. In this case, according to the session change accept message, i.e., the Session Update Accept message, received in step 14b, the remote end 300 does not provide the playback control function with respect to the video media.

23) Upon ascertaining that the remote end 300 does not provide the playback control function with respect to the video media, the SCC AS-1 600*a* transmits a playback control request message requesting PAUSE with respect to the video media to the MRFC 700*a* that controls the MRFP 700*b* which has newly become as a counterpart node of the video media, through a media replication procedure of steps 1 to 15. Here, the SCC AS-1 600*a* may transmit the playback control request message with respect to each of the UEs sharing the video media to the MRFC 700*a* (namely, the SCC AS-1 600*a* transmits a PAUSE request with respect to the video media of the UE-1 and PAUSE request with respect to the video media of the UE-2 to the MRFC), or may transmit a single playback control request message together with information (such information may have a form of a UE list) indicating that playback control should be applied to all the UEs sharing the video media. In FIG. 4, it is illustrated that the SSC AS-1 600*a* includes UEs to which playback control is to be applied, in the form of a list (expressed as 'Target={UE-1, UE-2}' in FIG. 4), and transmits a single playback control request message to the MRFC 700A.

Unlike the case illustrated in FIG. 4, when the remote end 300 supports the playback control function with respect to the video media (namely, when the SCC AS-1 600*a* determines that the remote end 300 supports the playback control function with respect to the video media in step 22), the SCC AS-1 600*a* may transmit a playback control request message requesting PAUSE with respect to the video media to the remote end 300.

24) Upon receiving the playback control request message, the MRFC 700*a* performs pause on the video media of the UE-1 110 as a terminal sharing the video media. This may be performed as the MRFC 700*a* controls the MRFP 700*b* as a counterpart node of the UE-1 110 with respect to the video media.

25) The MRFC 700*a* performs pause with respect to the video media of the UE-2 120 as a terminal sharing the video media. This is performed as the MRFC 700*a* controls the MRFP 700*b* as a counterpart node of the UE-2 120 with respect to the video media.

26) The MRFC 700*a* transmits a playback control response message, i.e., Playback Control Response message, indicating that the playback control with respect to the video media has been completed to the SCC AS-1 600*a*.

27a~27d) The SCC AS-1 600*a* delivers the playback control response message, i.e., the Playback Control Response message, indicating that the playback control with respect to the video media has been completed to the UE 2 120.

Meanwhile, unlike the foregoing 19~21 steps, the SCC AS-1 600*a* as a hosting SCC AS may directly perform authorization on the request, instead of requesting authorization with respect to the request from the playback control master, for a case in which the playback control request is received from a terminal, rather than a master of the playback control. In this case, the SCC AS-1 600*a* corresponding to the hosting SCC AS may directly authorize the request according to a configuration, e.g., user preference or operator policy, or may not. When the SCC AS-1 600*a* corresponding to the hosting SCC AS directly authorizes the request, the SCC AS-1 600*a* performs authorization as to whether or not the UE-2 120 is permitted for playback control with respect to the video media based on 'reference for determining whether or not the UE is permitted for the playback control request' as described above in step S609 in FIG. 3, rather than performing steps 19 to 21.

Also, in FIG. 4, message exchange between each SCC AS and the MRFC may be directly performed between each SCC AS and each MRFC or may be performed through the S-CSCF such as SCC AS<-->S-CSCF<-->MRFC.

In FIG. 4, step 26 may be performed before steps 24 and 25 are performed. In this case, the playback control response message has a meaning as a response indicating that the MRFC has properly received the playback control request message.

In FIG. 4, each SCC AS and the MRFC are configured as separate nodes, but differently, they may be configured in a collocated form. Namely, in FIG. 4, the SCC AS-1 600*a* and the MRFC 700*a* may be collocated in a single node.

In FIG. 4, the case in which the UE requests playback control through the SIP session is taken as an example, but alternatively, a connection (or a session0 for a playback control may be separately generated and playback control may be requested through the connection.

Figure 5:
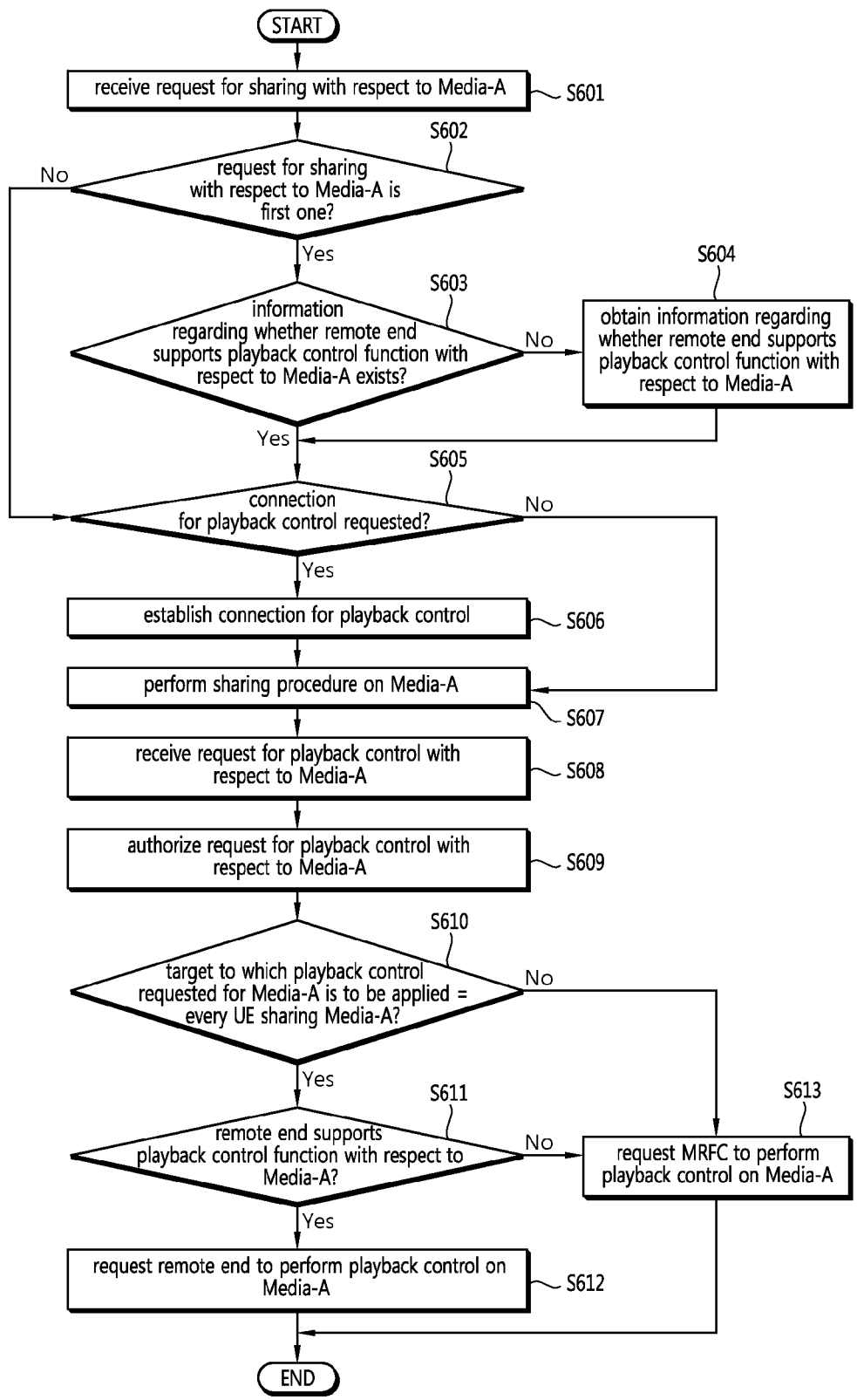
FIG. 5 is a flow chart illustrating an operation of a hosting SCC AS according to another example of the second embodiment in order to allow for controlling of shared media.

FIG. 5 is a flow chart illustrating an operation of a hosting SCC AS according to another example of the second embodiment in order to allow for controlling of shared media.

In comparison to FIG. 3, in FIG. 5, steps in which a connection (or a session) for a playback control is separately established (or generated), namely, steps S605 and S606, will be described in detail as follows, and the description with respect to FIG. 3 will be used for a description of the other steps.

First, in step S605, when the UE, which has requested sharing with respect to the Media-A, transmits a request message for media sharing, the UE checks whether or not information indicating that a connection (or a session0 for playback control with respect to the Media-A is included in the request message. Simply, such information may be an indicator requesting generation of a connection for playback control, or specifically, it may be protocol information for making a connection for playback control. Such information may be included by using one or more parameters among a header field of the request message, a body parameter of the header field of the request message, and a tag of the header field of the request message, and an existing defined parameter may be used or a parameter defined newly for an embodiment of the present invention may be used.

Subsequently, in step S606, when the UE includes the information indicating that a connection (or a session0 for playback control with respect to the Media-A in transmitting the request message for media sharing, the hosting SCC AS 600 establishes a connection (or session) for playback control with respect to the Media-A. A connection (or a session0 for playback control may be, for example, a TCP connection for carrying an RTSP (Real Time Streaming Protocol). However, the present invention is not necessarily limited thereto and the protocol for playback control may be a protocol other than the RTSP. Also, a transport protocol carrying the protocol performing playback control may be a protocol (e.g., a UDP), rather than a TCP. Details of the TCP connection to carry the RTSP may be based on 3GPP TS 26.237 v10.0.0.

Also, a time point at which the connection (or a session0 for playback control is generated may be when a session including the media is generated, rather than when the media is shared. For example, when the UE generates a session including the Media-A with the remote end, it may request that a connection (or a session) for playback control should be generated, and thus, at this time, a connection (or a session) for playback control may be established.

Figure 6A:
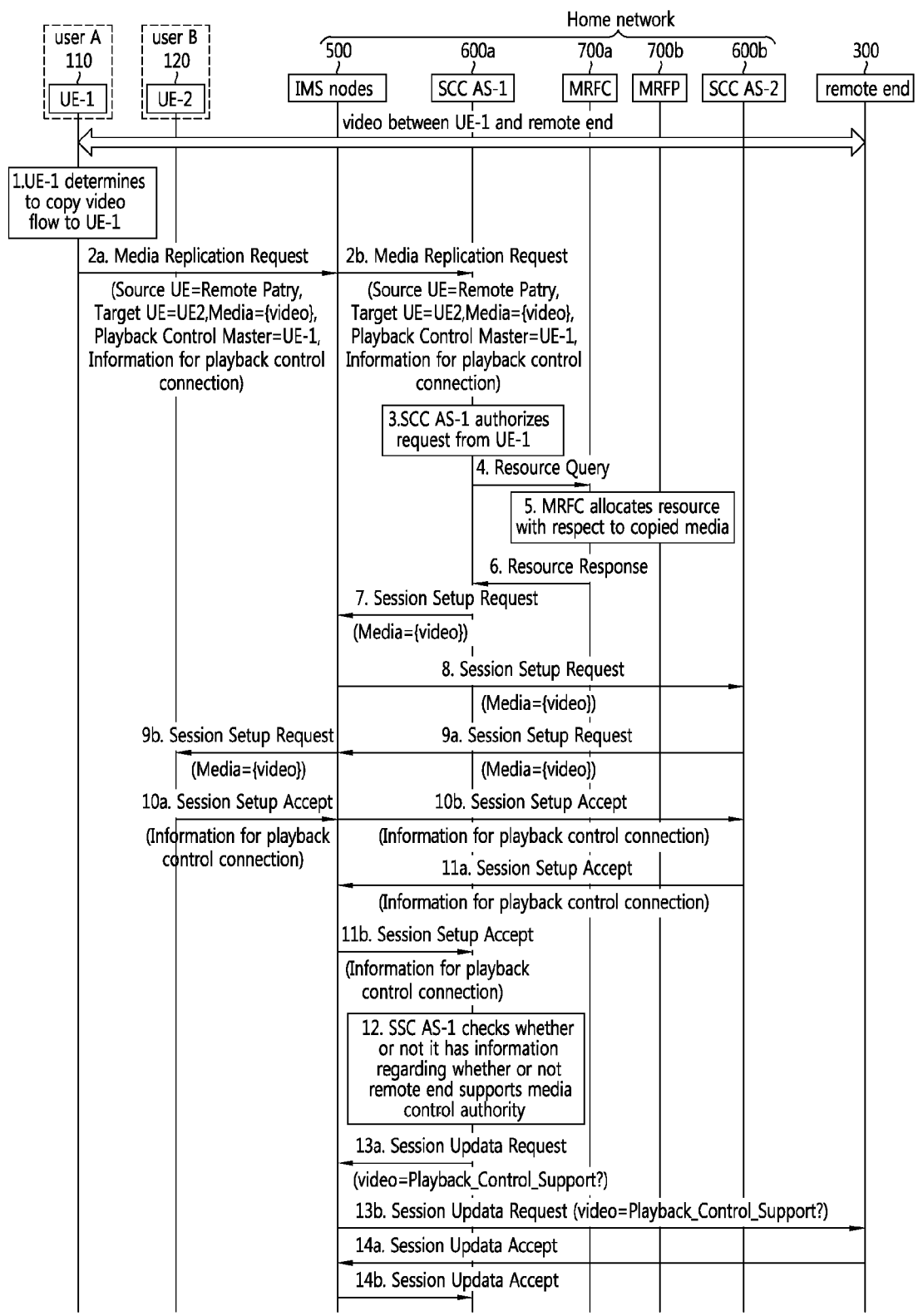
FIGS. 6A and 6B are signal flow charts illustrating a specified operation of FIG. 5.
Figure 6B:
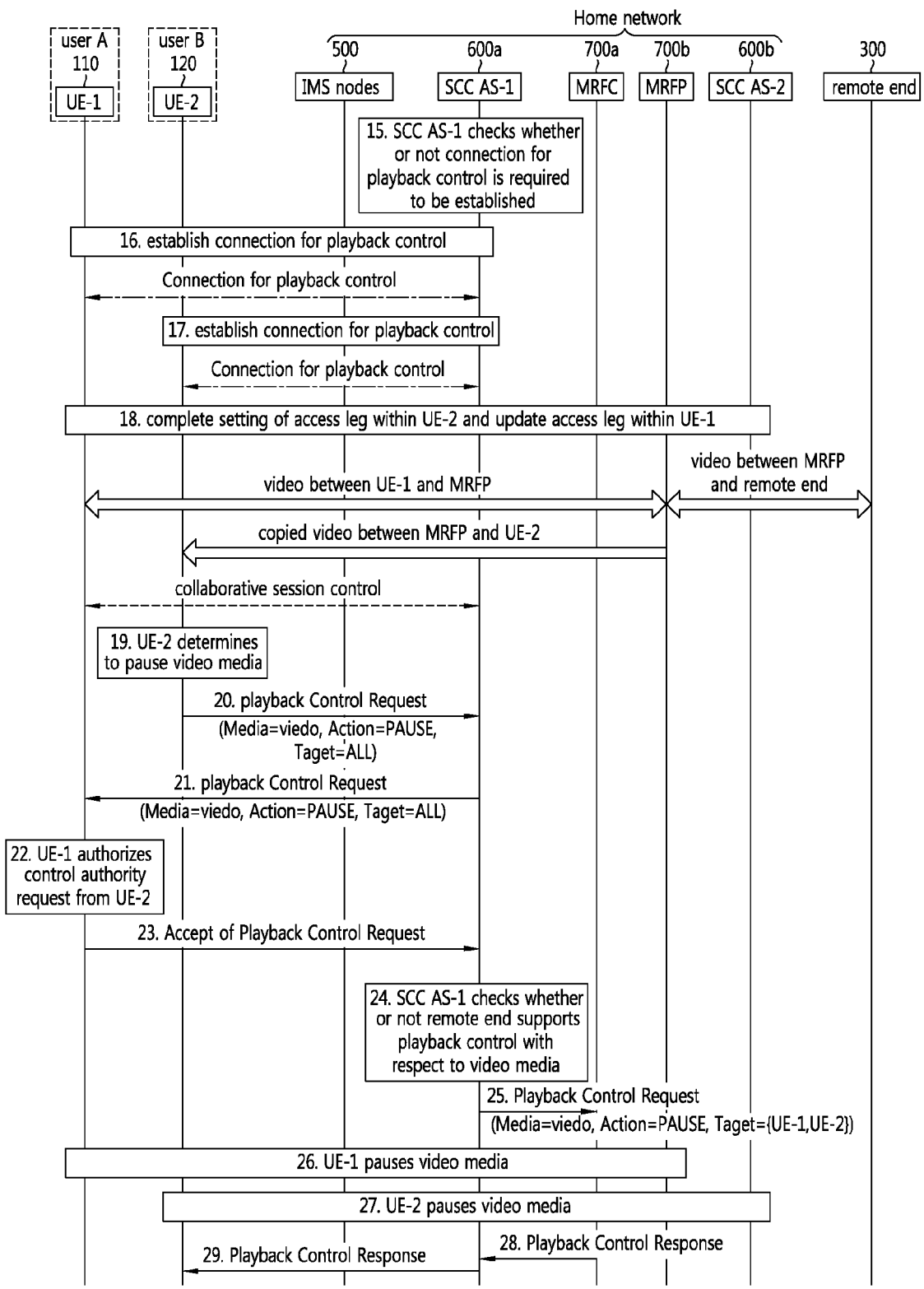

FIG. 6 is signal flow charts illustrating a specified operation of FIG. 5.

FIG. 6 shows a playback control operation with respect to media shared within a collaborative session. In particular, FIG. 6 shows a situation in which a UE, which is a controlee UE with respect to shared media within the collaborative session and not a playback control master, requests playback control, and in this case, a connection for playback control of media is separately generated to request playback control.

Also, in FIG. 6, the user A owns the UE-1 110 and the user B owns the UE-2 120. However, it is merely illustrative and the description hereinafter may be applicable in the same manner even when it is assumed that the user A owns both the UE-1 and the UE-2.

In FIG. 6, a home network to which the user A and the user B have been subscribed is illustrated. The home network includes the IMS (IP Multimedia Subsystem) node 500, the SCC AS (SCC AS-1) 600a serving the UE-1 110, and the SCC AS (SCC AS-2) 600b serving the UE-2 120. In the case of the IMS node 500 including the S-CSCF, although not specifically shown in FIG. 6, the same single S-CSCF may serve both of the UE-1 110 and the UE-2 120, and the S-CSCF serving the UE-1 110 and the S-CSCF serving the UE-2 120 may be different (for example, the S-CSCF-1 may serve the UE-1 belonging to the user A, and the S-CSCF-2 may serve the UE-2 belonging to the user B).

In FIG. 6, it is assumed that the user A is performing a session including video media with the remote end 300 through the UE-1 110 and the remote end 300 does not support a playback control function with respect to the video media.

1) In a state in which the user A is performing the session including video media with the remote end 300 by using the UE-1 110, he determines to copy a video media flow of the UE-1 110 to the UE-2 120.

2a~2b) In order to request copying of the video media flow to the UE-2 120, the UE-1 110 transmits a media sharing request message, e.g., a media replication request message (e.g., an SIP-based REFER message) to the SCC AS-1 600a. Here, the UE-1 110 may include information (expressed as 'information for playback control connection' in FIG. 6) indicating that a connection (or a session) for playback control with respect to the video media should be generated, in the media sharing request message, e.g., the media replication request message, to thus request generation of a connection for playback control. Also, the UE-1 110 may include information indicating which terminal is a playback control master with respect to the video media to be shared with the UE-2 120 from copying, in the media sharing request message, e.g., the media replication request message. In FIG. 6, it is illustrated that the UE-1 110 wants to be a playback control master with respect to the video media and the UE-1 110 includes information (expressed as 'Playback Control Master=UE-1' in FIG. 6) indicating that in the Media Replication Request message.

3) The SCC AS-1 600a authorizes or verifies the media sharing request message, e.g., the copy request message, from the UE-1 110. Such authorization or verification may be performed based on subscriber information. The authorization or verification may be verification as to whether or not the UE-1 110 is allowed for the request. Or, the authorization or verification may be verification as to whether or not media of the UE-1 110 can be copied to the UE-2 120, or the like.

4) The SCC AS-1 600a transmits a request message, i.e., resource query message, for obtaining information regarding resource required for copying video media to an MRFC 700a based on the media sharing request message, i.e., the copy request message.

5) Upon receiving the resource query message from the SCC AS-1 600a, the MRFC 700a allocates media resource for video media to be copied to an MRFP 700b. Such a resource allocation operation includes allocation of media port numbers required for the MRFP 700b to configure a bearer or a session of a user plane with the remote end 300, the UE-1 110, and the UE-2 120.

6) The MRFC 700a transmits a response message, i.e., a resource response message, including information regarding resource required for copying video media to the SCC AS-1 600a. The resource response message includes an IP address of the MRFP 700b and the media port numbers allocated in step 5.

7) The SCC AS-1 600a transmits a session setup request message (e.g., an SIP-based INVITE message) for setting up a session including video media between the UE-2 120 and the MRFP 700b to the UE-2 120 based on the Resource Response message. Here, the session setup request message, i.e., Session Setup Request message, may include information indicating that the video media is copied, to the UE-2 120.

8) Upon receiving the session setup request message, i.e., Session Setup Request message, from the SCC AS-1 600*a*, the IMS node 500 routes the message to the UE-2 120. Thus, the message is transferred to the SCC AS-2 600*b* serving the UE-2 120. The SCC AS-2 600*b* may authorize or verify the session setup request message. The authorization or verification may be performed based on subscriber information. This is similar to the foregoing content, so the foregoing content will be applied without a detailed description.

9a~9b) Upon receiving the session setup request message, i.e., the Session Setup Request message, the SCC AS-2 600*b* forwards the message to the UE-2 120.

10a~10b) The UE-2 120 transmits an accept message, i.e., a Session Setup Accept message (e.g., an SIP-based 200 OK message), with respect to the Session Setup Request message to the SCC AS-2 600*b* through the IMS node 500. When the UE-1 110 transmits the accept message, it may include information (expressed as 'information for playback control connection' in FIG. 6) indicating that a connection (or a session) for playback control with respect to the video media should be generated, to thus request a generation of a connection for playback.

11a~11b) The SCC AS-2 600*b* forwards the accept message, i.e., the Session Setup Accept message, to the SCC AS-1 600*a*.

12) Upon receiving the Session Setup Accept message from the UE-2 120, the SCC AS-1 600*a* checks whether or not it has information regarding whether or not the remote end 300 provides the playback control function with respect to the video media as copied media. In FIG. 6, it is assumed that the SCC AS-1 600*a* doest not have information regarding whether or not the remote end 300 provides the playback control function with respect to the video media as copied media. For reference, the information may be provided by stating that the remote end 300 supports the playback control function with respect to the video media, within an SIP header or an SDP message when the session including the video media is generated between the UE-1 110 and the remote end 300.

13a~13b) The SCC AS-1 600*a* transmits a session change request message, e.g., Session Update Request message (e.g., an SIP-based Re-INVITE message), including a changed matter according to the copying of the video media flow, to the remote end 300 through the IMS node 500. Here, the SCC AS-1 600*a* includes information (e.g., a parameter, an element, or an indicator) (expressed as 'video=Playback_Control_Support?' in FIG. 4) for inquiring as to whether or not the remote end 300 has capability to provide the playback control function with respect to the media requested to be shared, in the session change request message, i.e., the Session Update Request message. Such query information (a parameter, an element, or an indicator) may be included in an SIP header or an SDP message.

14a) Upon receiving the session change request message, i.e., the Session Update Request message, the remote end 300 transmits a session change accept message, i.e., Session Update Access message (e.g., an SIP-based 200 OK message) in response to the session change request from the SCC AS-1 600*a*. In this case, since the remote end 300 does not support the playback control function with respect to the video media as assumed above, information regarding the corresponding fact may be provided through the session change accept message, i.e., Session Update Accept message. In FIG. 6, by not including explicit information in relation to a support of the playback control function with respect to the video media requested to be shared, the fact that the remote end 300 does not support the function may be informed. Alternatively, by explicitly including information (e.g., it is included in the form of, for example, 'video:Playback_Control_Support=NO' in the SIP header or the SDP message), the fact that the remote end 300 does not support the playback control function with respect to the video media may be informed. If the remote end 300 fails to interpret (or understand) the query information regarding whether or not it supports the playback control function with respect to the video media included in the received Session Update Request message, the remote end 300 disregards the query information. This results in that the SCC AS-1 600*a* interprets that the remote end 300 does not support the playback control function with respect to the video media.

14b) The session change accept message, i.e., the Session Update Accept message, transmitted by the remote end 300 is delivered to the SCC AS-1 600*a* through the IMS node 500. Accordingly, a session including the video media is set up between the MRFP 700*b* and the remote end 300.

15) The SCC AS-1 600*a* checks whether or not a connection (or a session) for playback control with respect to the video media should be generated based on the media sharing request message or the media replication request message, e.g., the Media Replication Request message, received in step 2b. Since the UE-1 110 has included the information indicating that a connection (or a session) for playback control with respect to the video media should be generated, a corresponding connection should be generated.

16) The SCC AS-1 600*a* completes establishment of a connection for playback control with the UE-1 110. Before the establishment of the connection for playback control, the SCC AS-1 600*a* may perform authorization as to whether or not the UE-1 110 is permitted for playback with respect to the video media. Such authorization may be performed based on 'reference for determining whether or not the UE is permitted for the playback control request' as described above in step S609 in FIG. 3.

17) The SCC AS-1 600A completes establishment of a connection for playback control with the UE-2 120. Before the establishment of the connection for playback control, the SCC AS-1 600*a* may perform authorization as to whether or not the UE-2 120 is permitted for playback with respect to the video media. Such authorization may be performed based on 'reference for determining whether or not the UE is permitted for the playback control request' as described above in step S609 in FIG. 3.

18) The SCC AS-1 600*a* completes setting of Access Leg or an access connection of the UE-2 120, and updates Access Leg or an access connection of the UE-1 110. Accordingly, a video media flow is formed from the MRFP 700*b* to the UE-2 120 between the UE-1 110 and the MRFP 700*b*. Due to the media copying operation, a collaborative session in which the UE-1 110 is a controller UE and the UE-2 120 is a controllee UE is formed. Also, the hosting SCC AS with respect to the formed collaborative session is the SCC AS-1 600*a* serving the UE-1 110 as a controller UE.

19) The UE-2 120 determines to perform pause, one of playback control operations with respect to all the UEs that share the video media.

20) In order to request pausing of the video media flow, the UE-2 120 transmits a playback control request message, i.e., Playback Control Request message, to the SCC AS-2 600*b*.

The playback control request message is transmitted by using a communication protocol (e.g., an RTSP) determined when a connection for playback control is established, and includes information indicating what is a requested playback control operation (e.g., pausing, rewinding, etc.), information regarding media (including a plurality of media) to which control is to be applied, and information regarding a target (e.g., a particular UE(s) or every UE) to which playback control is to be applied. Besides, the playback control request message may further include various parameters required for playback control. For example, when a requested playback control operation is PAUSE, the playback control request message may further include information regarding a time, a position (or point), a frame, or the like, to which pause is applied. Such information may be included by using one or more parameters among a header field of the protocol used in the request message, a body parameter of the header field used in the request message, and a tag of the header field of the protocol used in the request message, and may use an existing defined parameter or a parameter newly defined in the present embodiment. Also, an SIP message itself requesting the playback control operation may indicate what is a requested playback control operation (e.g., RTSP_PAUSE).

If an extra playback control request message is used only for a case in which a target to which playback control is to be applied is every UE, there is no need to include information regarding the target to which playback control is to be applied. In FIG. 6, it is illustrated that the playback control request message includes formats such as Action=PAUSE' indicating what is a requested playback control operation, 'Media=video' indicating information regarding media to which playback control is to be applied, and 'Target=ALL' indicating information regarding a target to which playback control is to be applied.

21) Since the terminal, which has transmitted the playback control request message, is not a playback control master with respect to the video media to which playback control is applied, the SC AS-1 600a transfers the request message to the UE-1 110, a playback control master. When authorization has been already performed in establishing the connection for playback control with the UE-2 120 in step 17, steps 21 to 23 are not performed.

22) The UE-1 110 performs authorization on the playback control request.

23) The UE-1 110 transmits an accept message, i.e., Accept of Playback Control Request message, with respect to the playback control request to the SCC AS-1 600a.

24) Since the targets to which playback control is to be applied are all the UEs sharing the video media, the SCC AS-1 600a checks whether or not the remote end 300, as the original counterpart node of the video media as media to which playback control is to be applied, provides a playback control function with respect to the video media. In this case, according to the Session Update Accept message received in step 14b, the remote end 300 does not provide the playback control function with respect to the video media.

25) Upon ascertaining that the remote end 300 does not provide the playback control function with respect to the video media in step 24, the SCC AS-1 600a transmits a playback control request message requesting PAUSE with respect to the video media to the MRFC 700a that controls the MRFP 700b which has newly become as a counterpart node of the video media, through a media replication procedure of steps 1 to 18. Here, the SCC AS-1 600a may transmit the playback control request message with respect to each of the UEs sharing the video media to the MRFC 700a (namely, the SCC AS-1 600a transmits a PAUSE request with respect to the video media of the UE-1 and PAUSE request with respect to the video media of the UE-2 to the MRFC). Alternatively, the SCC AS-1 600a may transmit a single playback control request message together with information (such information may have a form of a UE list) indicating that playback control should be applied to all the UEs sharing the video media. In FIG. 6, it is illustrated that the SSC AS-1 600a includes UEs to which playback control is to be applied, in the form of a list (expressed as 'Target={UE-1, UE-2}' in FIG. 6), and transmits a single playback control request message to the MRFC 700A.

Unlike the case illustrated in FIG. 6, when the remote end 300 supports the playback control function with respect to the video media (namely, when the SCC AS-1 600a determines that the remote end 300 supports the playback control function with respect to the video media in step 20), the SCC AS-1 600a may transmit a playback control request message requesting PAUSE with respect to the video media to the remote end 300.

26) Upon receiving the playback control request message, the MRFC 700a performs pause on the video media of the UE-1 100 as a terminal sharing the video media. This may be performed as the MRFC 700a controls the MRFP 700b as a counterpart node of the UE-1 110 with respect to the video media.

27) The MRFC 700a performs pause with respect to the video media of the UE-2 120 as a terminal sharing the video media. This is performed as the MRFC 700a controls the MRFP 700b as a counterpart node of the UE-2 120 with respect to the video media.

28) The MRFC 700a transmits a playback control response message, i.e., Playback Control Response message, indicating that the playback control with respect to the video media has been completed to the SCC AS-1 600a.

29) The SCC AS-1 600a delivers the playback control response message, i.e., the Playback Control Response message, indicating that the playback control with respect to the video media has been completed to UE-2 120.

Meanwhile, the SCC AS-1 600a as a hosting SCC AS may directly perform authorization on the request as in steps 21 to 23, instead of requesting authorization with respect to the request from the playback control master, for a case in which the playback control request is received from a terminal, rather than a master of the playback control. In this case, the SCC AS-1 600a corresponding to the hosting SCC AS may directly authorize the request according to a configuration, e.g., user preference or operator policy, or may not. When the SCC AS-1 600a corresponding to the hosting SCC AS directly authorizes the request, the SCC AS-1 600a performs authorization as to whether or not the UE-2 120 is permitted for playback control with respect to the video media based on 'reference for determining whether or not the UE is permitted for the playback control request' as described above in step S609 in FIG. 3, rather than performing steps 21 to 23.

Also, in FIG. 6, message exchange between each SCC AS and the MRFC may be directly performed between each SCC AS and each MRFC or may be performed through the S-CSCF such as SCC AS<->S-CSCF<->MRFC.

In FIG. 6, after step 25, step 28 may be performed before steps 26 and 27 are performed. In this case, the playback control response message has a meaning as a response indicating that the MRFC has properly received the playback control request message.

In FIG. 6, each SCC AS and the MRFC are configured as separate nodes, but differently, they may be configured in a collocated form. Namely, in FIG. 6, the SCC AS-1 600a and the MRFC 700a may be collocated in a single node.

In FIG. 6, the connection for playback control is established between the UE and the hosing SCC AS 600. However, alternatively, the connection for playback control may be established between the UE and the MRFC or between the UE and a different node providing a playback control function (e.g., media streaming server, streaming adapter, media gateway, etc.). In this case, when the MRFC or the different node receives a playback control request message transmitted from the UE, the MRFC or the different node may directly process the request message by itself or may transfer the message to the hosting SCC AS 600 administering a collaborative session to request processing of the playback control request.

The method for requesting playback control by the UE is not limited to the method for requesting playback control through an SIP session or the method for generating a connection for playback control and requesting playback control therethrough as discussed above. In addition, various other methods such as requesting playback control by using a Ut interface between the UE and the SCC AS, and the like, may be used.

Figure 7A:
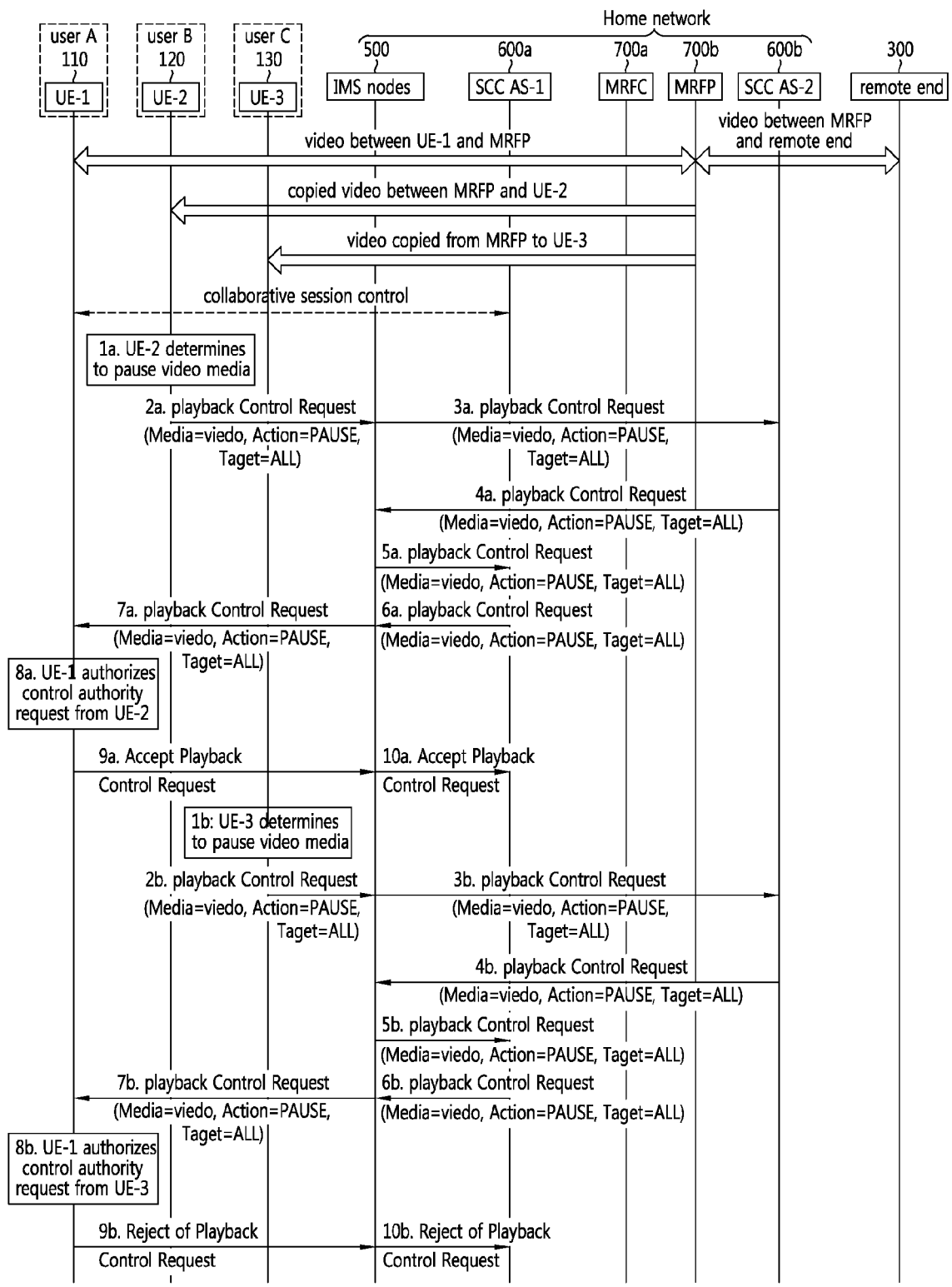
FIGS. 7A and 7B are signal flow charts illustrating an operation of a playback control master according to another example of the second embodiment in order to allow for controlling of shared media.
Figure 7B:
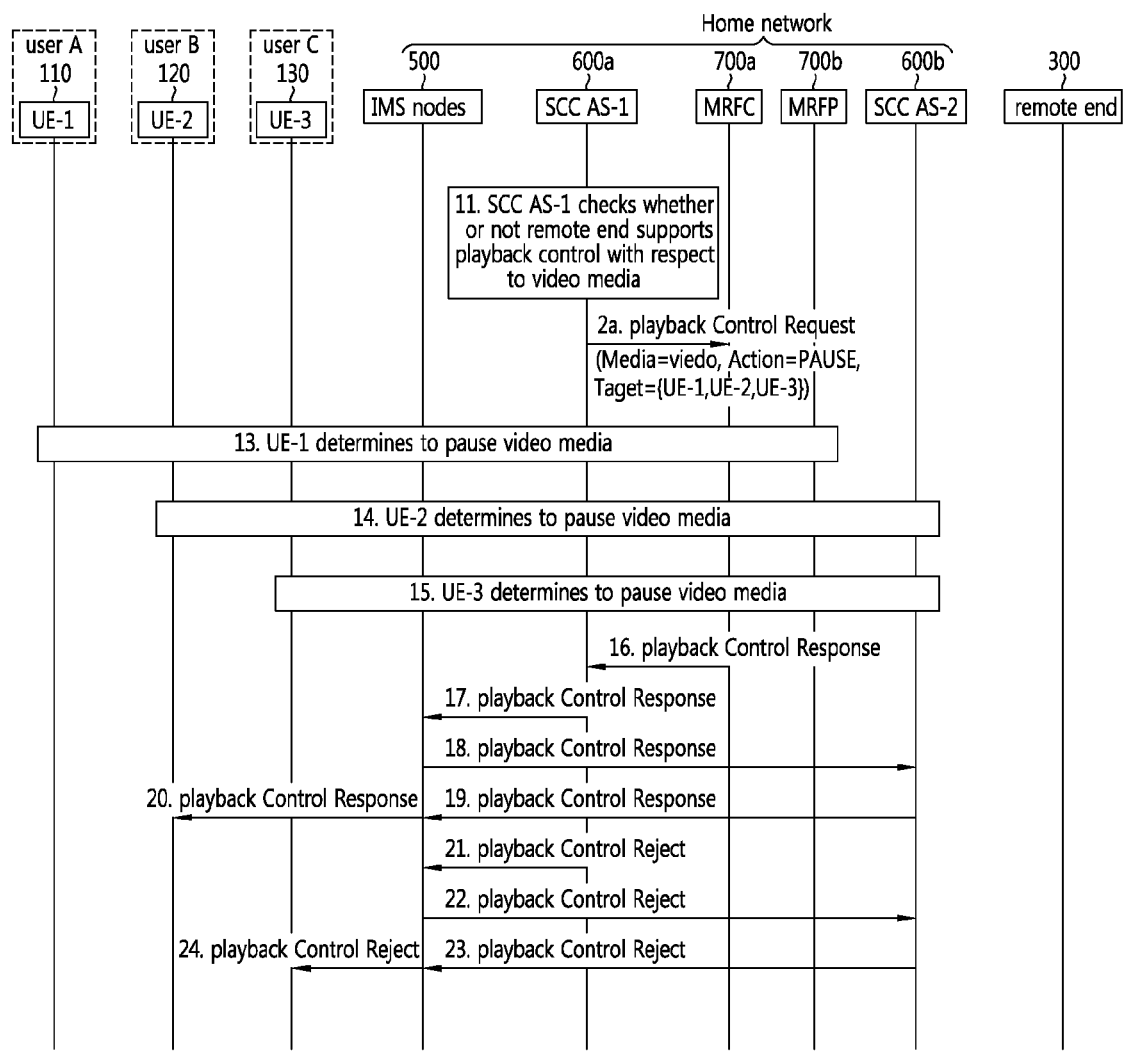

FIG. 7 is signal flow charts illustrating an operation of a playback control master according to another example of the second embodiment in order to allow for controlling of shared media.

Referring to FIG. 7, the user A owns the UE-1 110, the user B owns the UE-2 120, and a user C owns a UE-3 130. However, it is merely illustrative and the description hereinafter may be applicable in the same manner even when it is assumed that the user A owns the UE-1, the UE-2, and the UE-3.

In FIG. 7, a home network to which the user A, the user B, and the user C have been subscribed is illustrated. The home network includes the IMS (IP Multimedia Subsystem) node 500, the SCC AS (SCC AS-1) 500*a* serving the UE-1 110, and the SCC AS (SCC AS-2) 500*b* serving the UE-2 120 and the UE-3 130. In the case of the IMS node 500 including the S-CSCF, although not specifically shown in FIG. 7, the same S-CSCF may serve all of the UE-1 110, the UE-2 120, and the UE-3 130, and the S-CSCF serving the UE-1 110, the UE-2 120, and the UE-3 130 may be different (for example, the S-CSCF-1 may serve the UE-1 belonging to the user A, the S-CSCF-2 may serve the UE-2 belonging to the user B, and the S-CSCF-3 may serve the UE-3 belonging to the user C).

In FIG. 7, it is assumed that the user A copies a session including video media performed with the remote end through the UE-1 110 to the UE-2 120 of the user B and the UE-3 130 of the user C, and the remote end 300 does not support a playback control function with respect to the video media. Also, it is assumed that a master of playback control with respect to the shared video media is the UE-1.

FIG. 7 shows that the UE-2 and UE-3, which are controllee UEs with respect to the shared media belonging to a collaborative session and not masters of playback control, simultaneously request playback control, and an operation of the playback control master in this case. FIG. 7 shows an operation of requesting playback control through an SIP session generated for media by the UE-2 and UE-3.

1a) The UE-2 120 determines to perform pause, one of playback control operations with respect to all the UEs that share the video media.

2a~3a) In order to request pausing of the video media flow, the UE-2 120 transmits a playback control request message, i.e., Playback Control Request message, to the SCC AS-2 600*b*.

4a~5a) Upon receiving the playback control request message from the UE-2 120, the SCC AS-2 600*b* forwards the message to the SCC AS-1 600*a* as a hosting SCC AS 600 of the collaborative session to which the UE-2 120 belongs. Thus, the playback control request message is delivered to the SCC AS-1 600*a* through the IMS node 500.

6a~7a) Since the terminal, which has transmitted the playback control request message, is not a playback control master with respect to the video media to which playback control is applied, the SC AS-1 600*a* transfers the request message to the UE-1 110, a playback control master.

8a) The UE-1 110 performs authorization on the playback control request.

9a~10a) The UE-1 110 transmits an accept message, i.e., Accept of Playback Control Request message, with respect to the playback control request to the SCC AS-1 600*a*.

1b) Meanwhile, the UE-3 130 also determines to perform pause, one of playback control operations with respect to all the UEs that share the video media.

2b~3b) In order to request pausing of the video media flow, the UE-3 130 transmits a playback control request message, i.e., Playback Control Request message, to the SCC AS-2 600*b*.

4b~5b) Upon receiving the playback control request message from the UE3 130, the SCC AS-2 600*b* forwards the message to the SCC AS-1 600*a* as a hosting SCC AS 600 of the collaborative session to which the UE-3 130 belongs. Thus, the playback control request message is delivered to the SCC AS-1 600*a* through the IMS node 500.

6b~7b) Since the terminal, which has transmitted the playback control request message, is not a playback control master with respect to the video media to which playback control is applied, the SC AS-1 600*a* transfers the request message to the UE-1 110, a playback control master. Steps 1b to 17 may be performed in parallel.

8b) The UE-1 110 performs authorization on the playback control request. In this case, since the UE-1 110 has determined to accept the playback control operation requested by the UE-2 120 based on the playback control request message already received in step 7a, the UE-1 110 determines to reject the playback control request from the UE-3 130. If the UE-1 110 has first received the playback control request of the UE-3 130 before the playback control request of the UE-2 120 (namely, when step 7b is performed first before step 7a), the UE-1 110 may accept the playback control request of the UE-3 130 and reject that of the UE-2 120.

9b~10b) The UE-1 110 transmits a reject message, e.g., Reject of Playback Control Request message, with respect to the playback control request to the SCC AS-1 600*a*.

11) Since the targets to which playback control is to be applied are all the UEs sharing the video media, the SCC AS-1 600*a* checks whether or not the remote end 300, as the original counterpart node of the video media as media to which playback control is to be applied, provides a playback control function with respect to the video media. In this case, according to the assumption of FIG. 7 as mentioned above, the remote end 300 does not provide the playback control function with respect to the video media.

12) Upon ascertaining that the remote end 300 does not provide the playback control function with respect to the video media in step 11, the SCC AS-1 600*a* transmits a playback control request message to the MRFC 700*a* that controls the MRFP 700*b* which has newly become as a counterpart node of the video media, through a media replication procedure, in order to request PAUSE with respect to the video media.

13) Upon receiving the playback control request message, the MRFC 700*a* performs pause on the video media of the UE-1 100 as a terminal sharing the video media. This may be performed as the MRFC 700*a* controls the MRFP 700*b* as a counterpart node of the UE-1 110 with respect to the video media.

14) The MRFC 700*a* performs pause with respect to the video media of the UE-2 120 as a terminal sharing the video media. This is performed as the MRFC 700*a* controls the MRFP 700*b* as a counterpart node of the UE-2 120 with respect to the video media.

15) The MRFC 700*a* performs pause with respect to the video media of the UE-3 130 as a terminal sharing the video media. This is performed as the MRFC 700*a* controls the MRFP 700*b* as a counterpart node of the UE-3 130 with respect to the video media.

16) The MRFC 700*a* transmits a playback control response message, i.e., Playback Control Response message, indicating that the playback control with respect to the video media has been completed to the SCC AS-1 600*a*.

17~20) The SCC AS-1 600*a* delivers the playback control response message, i.e., the Playback Control Response message, indicating that the playback control with respect to the video media has been completed to UE-2 120.

21~24) Upon receiving the reject message with respect to the playback control request of the UE-3 130 in step 10b, the SCC AS-1 600*a* delivers a playback control reject message, e.g., Playback Control Reject message, indicating that the playback control request with respect to the video media is rejected to the UE-3 130. Steps 21 to 24 may be performed immediately after step 10b.

As illustrated in FIGS. 4 and 6, a playback control master may be designated when the media sharing is requested or when the UE requests playback control. Besides, when the UE transmits an SIP message to the IMS network, it may include information designating a playback control master in the SIP message and transmits the same, or the UE may designate by using various protocols such as XCAP, or the like, rather than using an SIP message.

Also, the playback control master may be modified variously. Namely, the UE may include information for changing a playback control master in an SIP message and transmit the same, or may change the playback control master by using various protocols such as XCAP, or the like, rather than using an SIP message. Also, the terminal as a playback control master may request changing of the playback control master, or a terminal that wants to become a playback control master may request becoming of the playback control master by itself.

The method according to exemplary embodiments of the present invention described thus far may be implemented as software, hardware or a combination thereof. For example, the method according to exemplary embodiments of the present invention may be stored in a storage medium (e.g., an internal memory, a flash memory, a hard disk, or the like), and may be implemented as codes or commands in a software program that can be executed by a processor (e.g., a microprocessor).

Figure 8:
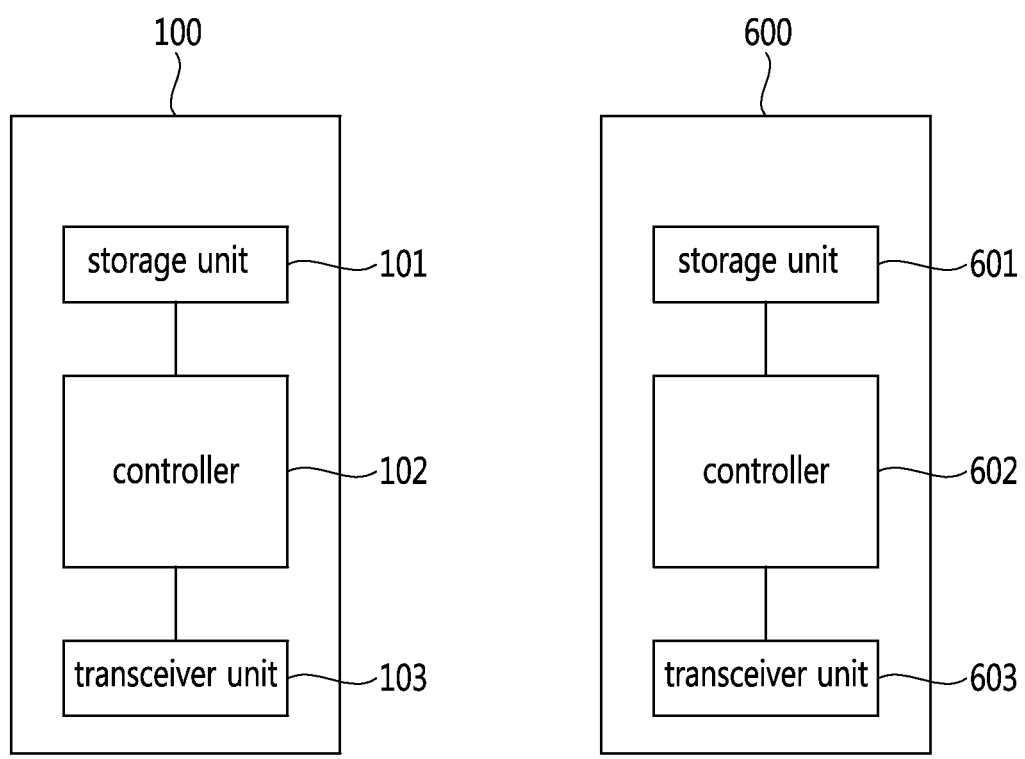
FIG. 8 is a block diagram illustrating a configuration of a UE 100 and an SCC AS 600 according to an embodiment of the present invention.

FIG. 8 is a block diagram illustrating a configuration of a UE 100 and an SCC AS 600 according to an embodiment of the present invention.

As illustrated in FIG. 8, the UE 100 includes a storage unit 101, a controller 102, and a transceiver unit 103. The SCC AS 600 includes a storage unit 601, a controller 602, and a transceiver unit 603.

The storage units 101 and 601 store a method according to at least any one of the first and second embodiments illustrated in FIGS. 3 through 7.

The controllers 102 and 602 control the storage units 101 and 601 and the transceiver units 103 and 603. In detail, the controllers 102 and 602 execute the methods stored in the storage units 101 and 601. The controllers 102 and 602 transmit the foregoing signals through the transceivers 103 and 603.

While the present invention has been shown and described in connection with the embodiments, it will be apparent to those skilled in the art that modifications and variations can be made without departing from the spirit and scope of the invention as defined by the appended claims.

The invention claimed is:

1. A method of controlling, by a control server, a first terminal, which is currently performing a session including one or more of media among audio, video, and text media, with a remote end to share one or more of media within the session with a second terminal, the method comprising:
   receiving, by the control server, a media sharing request message for requesting sharing one or more media within the session with the remote end between the first terminal and the second terminal, from the first terminal or the second terminal, the media sharing request message including:
      a first indication indicating which terminal is a playback control master with respect to the media requested to be shared; and
      a second dication indicating whether or not an extra connection is required for playback control with respect to the media requested to be shared;
   requesting, by the control server, a resource allocation from a media server handling media sharing;
   checking, by the control server, whether or not there is information regarding whether or not the remote end can provide a playback control function with respect to the media requested to be shared; and
   transmitting, by the control server, a session change request message to the remote end such that the session goes through the media server, the session change request message including an inquiry indicator for inquiring as to whether or not the remote end can provide the playback control function with respect to the media requested to be shared when the information does not exist, the inquiry indicator being included in a Session Initiation Protocol (SIP) header or a Session Description Protocol (SDP) message;
   receiving, by the control server, a session change response message from the remote end, information whether or not the remote end can provide the playback control function with respect to the media requested to be shared being provided to the control server through the session change response message when the session change request message includes the inquiry indicator;
   receiving, by the control server, a media playback control request message by the first terminal or the second terminal, the media playback control request message including a third indication indicating who is a master handling playback control of the media requested for playback control;
   when the first terminal or the second terminal, which has transmitted the received media playback control request message, is not a master handling the playback control, transferring the media playback control request message to a terminal corresponding to the master;
   receiving an acceptance message with respect to the media playback control request message from the corresponding terminal;
   checking, by the control server, whether or not the remote end can provide the playback control function with respect to the shared media; and when the remote end cannot perform the playback control function, requesting an entity that controls the media server to control playback with respect to the shared media such that the shared media can be controlled according to the request, wherein all operations are performed based on an IP Multimedia Subsystem (IMS) network, wherein the session is a collaborative session that is a logical set of an IMS session over the first terminal or the second terminal, which is anchored on a Service Centralization and Continuity Application Server (SCC AS) to be combined into a single IMS session, wherein the control server is the SCC AS that is an application server supporting multimedia session continuity, wherein the playback control function is provided with respect to a multicast media stream, wherein a buffering function is provided to a counterpart node of the media with respect to the first terminal or the second terminal, to perform the playback control function, and wherein the buffering function is further provided to a node that plays a role with respect to the counterpart node of the media, to perform the playback control function.

2. The method of claim 1, wherein the media sharing request message further includes one or more of:
information indicating what is the media requested to be shared; and
information indicating which terminal is to share the media.

3. The method of claim 1, wherein the media sharing request message is a media copy request message or a media replication request message.

4. The method of claim 1, further comprising one or more of:
authorizing, by the control server, the media sharing request message, after the media sharing request message is received; and
transmitting, by the control server, a resource allocation request message to the media server, and subsequently receiving a resource allocation response message from the media server.

5. The method of claim 1, further comprising:
when the second terminal is not handled by the control server, transmitting, by the control server, a session setup request message to a different control server serving the second terminal, after requesting sharing from the media server; and
receiving, by the control server, a session setup response message from the different control server,
wherein the checking of the presence of the information is performed en the session setup response message is received.

6. The method of claim 1, wherein the media playback control request message includes one or more of:
information regarding media to be controlled for playback;
information indicating a control operation requested for playback of the media; and
information indicating a terminal to which the playback of the media is applied.

7. The method of claim 1, wherein an inability of the remote end to perform playback control indicates that the remote end cannot provide the playback control function or that requested media playback is not related to any of the first and second terminals.

8. The method of claim 1, further comprising:
determining, by the playback control server, whether an extra connection is to be generated for playback control with respect to the media based on the received media sharing request message; and
when it is determined that the connection establishment is required, establishing a connection for playback control with the first terminal and the second terminal, respectively.

9. A control server providing control to allow a first terminal, which is currently performing a session including one or more of media among audio, video, and text media, with a remote end to share one or more of media within the session with a second terminal, the control server comprising:
a transceiver unit; and
a controller configured to:
control the transceiver unit;
receive a media sharing request message for requesting sharing one or more media within the session with the remote end between the first terminal and the second terminal, from the first terminal or the second terminal through the transceiver unit, the media sharing request message including:
a first indication indicating which terminal is a playback control master with respect to the media requested to be shared; and
a second indication indicating whether or not an extra connection is required for playback control with respect to the media requested to be shared;
request a resource allocation from a media server handling media sharing through the transceiver unit;
check whether or not there is information regarding whether or not the remote end can provide a playback control function with respect to the media requested to be shared through the transceiver unit;
transmit a session change request message to the remote end through the transceiver unit such that the session goes through the media server, the session change request message including an inquiry indicator for inquiring as to whether or not the remote end can provide the playback control function with respect to the media requested to be shared, when the information does not exist, the inquiry indicator being included in a Session Initiation Protocol (SIP) header or a Session Description Protocol (SDP) message;
receive a session change response message from the remote end through the transceiver unit, information whether or not the remote end can provide the playback control function with respect to the media requested to be shared being provided to the control server through the session change response message, when the session change request message includes the inquiry indicator;
receive a media playback control request message by the first terminal or the second terminal through the transceiver unit, the media playback control request message including a third indication indicating who is a master handling playback control of the media requested for playback control;
when the first terminal or the second terminal, which has transmitted the received media playback control request message, is not a master handling the playback control, transfer the media playback control request message to a terminal corresponding to the master;
receive an acceptance message with respect to the media playback control request message from the corresponding terminal;

check whether or not the remote end can provide the playback control function with respect to the shared media; and when the remote end cannot perform the playback control function, request an entity that controls the media server to control playback with respect to the shared media through the transceiver unit such that the shared media can be controlled according to the request, wherein all operations are performed based on an IP Multimedia Subsystem (IMS) network, wherein the session is a collaborative session that is a logical set of an IMS session over the first terminal or the second terminal, which is anchored on a Service Centralization and Continuity Application Server (SCC AS) to be combined into a single IMS session, wherein the control server is the SCC AS that is an application server supporting multimedia session continuity, wherein the playback control function is provided with respect to a multicast media stream, wherein buffering function is provided to a counterpart node of the media with respect to the first terminal or the second terminal, to perform the playback control function, and wherein the buffering function is further provided to a node that plays a proxy role with respect to the counterpart node of the media, to perform the playback control function.

10. The control server of claim 9, wherein the media sharing request message includes one or more of:

information indicating which terminal is a playback control master with respect to the media requested to be shared;

information indicating what is the media requested to be shared; and information indicating which terminal is to share the media, wherein the media sharing request message is a media copy request message or a media replication request message.

11. The control server of claim 9, wherein an inability of the remote end to perform playback control indicates that the remote end cannot provide the playback control function or that requested media playback is not related to any of the first and second terminals.

* * * * *